(12) United States Patent
Almehmadi et al.

(10) Patent No.: US 9,703,952 B2
(45) Date of Patent: Jul. 11, 2017

(54) DEVICE AND METHOD FOR PROVIDING INTENT-BASED ACCESS CONTROL

(71) Applicant: UNIVERSITY OF ONTARIO INSTITUTE OF TECHNOLOGY, Oshawa (CA)

(72) Inventors: Abdulaziz Mohammed Almehmadi, Oshawa (CA); Khalil El-Khatib, Oshawa (CA)

(73) Assignee: UNIVERSITY OF ONTARIO INSTITUTE OF TECHNOLOGY, Oshawa (CA)

( * ) Notice: Subject to any disclaimer, the term of this patent is extended or adjusted under 35 U.S.C. 154(b) by 100 days.

(21) Appl. No.: 14/793,264

(22) Filed: Jul. 7, 2015

(65) Prior Publication Data
US 2016/0004862 A1 Jan. 7, 2016

Related U.S. Application Data

(60) Provisional application No. 62/021,285, filed on Jul. 7, 2014.

(51) Int. Cl.
*G06F 7/04* (2006.01)
*G06F 21/55* (2013.01)
*G06F 21/62* (2013.01)
*G06F 21/32* (2013.01)

(52) U.S. Cl.
CPC ............ *G06F 21/552* (2013.01); *G06F 21/32* (2013.01); *G06F 21/6218* (2013.01); *G06F 2221/2103* (2013.01); *G06F 2221/2113* (2013.01)

(58) Field of Classification Search
CPC .... G06F 21/552; G06F 21/32; G06F 21/6218; G06F 2221/2113; G06F 2221/2103
USPC .......................................................... 726/24
See application file for complete search history.

(56) References Cited

U.S. PATENT DOCUMENTS

| 8,627,476 B1* | 1/2014 | Satish ...................... G06F 21/51 713/187 |
| 2011/0016534 A1* | 1/2011 | Jakobsson ............. G06F 21/316 726/28 |
| 2014/0279641 A1* | 9/2014 | Singh ..................... G06Q 10/06 705/325 |

\* cited by examiner

*Primary Examiner* — Mohammad W Reza
(74) *Attorney, Agent, or Firm* — Norton Rose Fulbright Canada LLP

(57) ABSTRACT

Embodiments relate generally to access control, and more particularly to systems and methods for providing access control based on user intent. An intent-based access control method is provided comprising: receiving, from a user, a request to gain access to a protected resource; presenting stimuli to the user to evoke a physiological or behavioral response at one or more time points or time periods; receiving a signal of the physiological or behavioral response, the one or more physiological signals associated with one or more time codes that correspond to the one or more time points or time periods for the presenting of the stimuli; processing the received signal to assess an intention of the user; and in response to the processing, selectively granting the user access to the protected resource. Various systems, methods, and non-transitory computer-readable media are also described.

7 Claims, 17 Drawing Sheets

DEVICE AND METHOD FOR PROVIDING INTENT-BASED ACCESS CONTROL

CROSS REFERENCE

This application claims all benefit, including priority, U.S. Application No. 62/021,285, filed Jul. 7, 2014.

TECHNICAL FIELD

Embodiments described herein relate generally to access control, and more particularly to systems and methods for providing access control based on user intent.

BACKGROUND

In modern society, technological security is an essential aspect of everyday life. However, security breaches occur frequently, and range from information disclosure that may incur public embarrassment, loss of trust and reputation, or identity theft, to breaches that may result in loss of lives. Various security mechanisms are used to protect the Confidentiality, Integrity, and Availability (CIA) of information and to provide a safe and secure environment. An example security mechanism is access control which is used to grant access to information to only authorized entities.

SUMMARY

In a first aspect, an intent-based access control method is provided, comprising: receiving, from a user, one or more electronic signals representative of a request to obtain access to a protected resource; monitoring one of more physiological signals associated with the user, the one or more physiological signals including at least brain signals; presenting stimuli to the user, the stimuli adapted to evoke a physiological or behavioral response; measuring one or more event-related potentials in the monitored one or more physiological signals; processing the one or more event-related potentials to detect signals indicative of (i) a potential intention of the user and (ii) a potential motivation of the user to act on the potential intention; processing the one or more event-related potentials to assign (i) an intention score based at least on the detected signals indicative of the potential intention of the user and (ii) a motivation score based at least on the detected signals indicative of the potential motivation of the user to act on the potential intention; determining a risk score associated with the protected resource based at least on the intention score and motivation score in relation to an impact of malicious access to the protected resource; and determining whether the request to obtain access to the protected resource should be granted or denied based at least on a combination of the intention score, the motivation score, and the risk score.

In another aspect, the method further comprises: if the user that obtains access to the protected resource is associated with an intention score above a first pre-defined threshold and a motivation score above a pre-defined threshold, toggling an electronic flag in an electronic profile associated with the user to indicate that the user should be monitored for a pre-defined period of time to detect a future potential motivation.

In another aspect, the motivation score is adapted to correspond at least to the likelihood of the potential intention being executed by the user.

In another aspect, the access to the protected resource may be granted at a number of different levels, each of the different levels having different access permissions.

In another aspect, the method further comprises: using the combination of the intention score, the motivation score, and the risk score, determining a level of access to be provided to the user; and providing access at the determined level of access to the user.

In another aspect, the one or more event-related potentials includes at least a P300 signal, the processing of the one or more event-related potentials includes measuring a peak amplitude of the P300 signal.

In another aspect, the peak amplitude of the P300 signal is indicative of both the potential intention and the potential motivation of the user, the potential intention being detected when the peak amplitude is greater than a pre-defined threshold, and the potential motivation being quantified as proportional to the peak amplitude of the P300 signal. An intent-based access control method comprising: receiving, from a user, a request to gain access to a protected resource; presenting stimuli to the user to evoke a physiological or behavioral response at one or more time points or time periods; receiving a signal of the physiological or behavioral response, the one or more physiological signals associated with one or more time codes that correspond to the one or more time points or time periods for the presenting of the stimuli; processing the received signal to assess an intention of the user; and in response to the processing, selectively granting the user access to the protected resource.

In another aspect, the physiological or behavioral signal is an electroencephalogram signal.

In another aspect, the electroencephalogram signal is a P300 signal.

In another aspect, the processing of the received signal comprises measuring a motivation level of the user to execute the intention.

In another aspect, the selectively granting of the user access comprises calculating a risk level associated with granting the user access to the protected resource.

In another aspect, the step of calculating the risk level takes into account the nature or importance of the protected resource, an assessed intention score, and a motivation score.

In another aspect, the selectively granting the user access comprises comparing the calculated risk level against a pre-determined risk threshold.

In another aspect, an intent-based access control system is provided, comprising: a user interface adapted to receive, from the user, a request to gain access to a protected resource, and to present stimuli to the user to evoke a physiological or behavioral response; a sensor interface adapted to receive a signal of the physiological or behavioral response; a processor adapted to process the received signal to assess an intention of the user; and in response to the processing, selectively grant the user access to the protected resource.

In another aspect, the processor is further adapted to process the received signal to assess a motivation of the user.

In another aspect, the processor is further adapted to determine a risk score based at least on an impact of malicious or unauthorized access of the protected resource.

In another aspect, the processor is further adapted to (i) determine an intention score associated with the assessed intention of the user, (ii) determine a motivation score associated with assessed the motivation of the user, and (iii) selectively grant the user access to the protected resource in response to the processing of a combination of at least the intention score, the motivation score, and the risk score.

In another aspect, the system is implemented as a backend system used for providing access decisions to one or more external systems.

In another aspect, the external systems include at least one of facility access systems, financial systems, gaming systems, advertising systems, and document management systems. In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments are illustrated by way of example. It is to be expressly understood that the description and drawings are only for the purpose of illustration and as an aid to understanding, and are not intended as a definition of the limits of the invention.

Embodiments will now be described, by way of example only, with reference to the attached figures, wherein.

DETAILED DESCRIPTION

Figure 1:
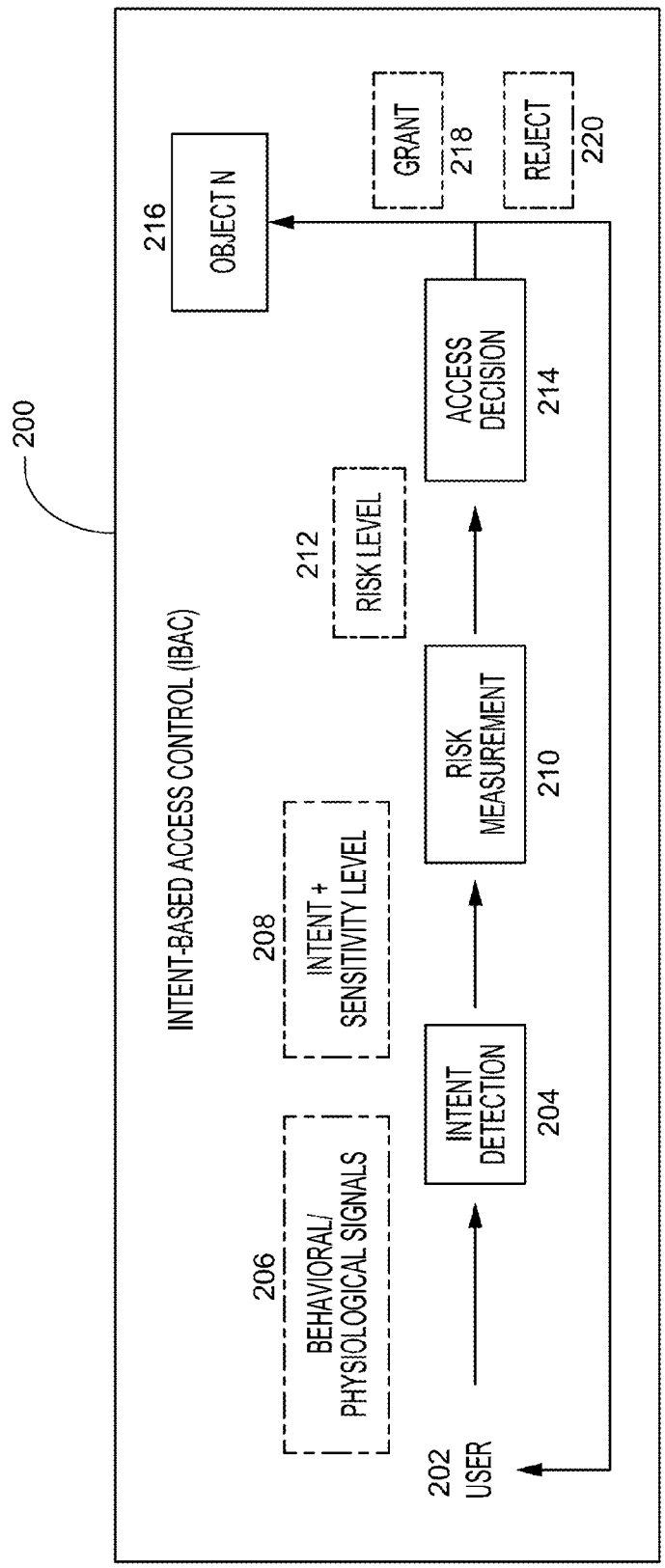
FIG. 1 is a flow diagram of an intent-based access control system and method, according to an example embodiment.

The present disclosure provides an intent-based access control (IBAC) system and method that selectively and automatically grants access by electronically determining a user's intent and motivation for accessing protected resources. By way of illustrative example a user's intent may be the user's reason for requesting access to the protected resources.

Access control may be the set of policies and mechanisms that control electronic access by entities to one or more protected resources. For example, access controls may determine requirements for entities to access protected resources and grant access for the entities to the protected resources when the requirements are satisfied. The purpose of access controls may be to control who is permitted to access what resource(s), at what level or scope of access, how the entity can access the resources, where the entity can access the resources, and/or during what time period as defined by the requirements. Thus, the general purpose of access control mechanisms is to safeguard systems and other protected resources from unauthorized access to prevent security breaches. Example access control systems may have two components, namely authentication and authorization. Authentication is the process of verifying or determining a user's identity. Users whose identities have been determined/verified by the system may be checked against permissions rules or requirements defined and managed electronically by the access control system. Authorization mechanisms may be based on permission assignments for entities. The output of the authentication mechanisms is used by authorization mechanisms to determine what permissions have been granted to what entities. The output may be an access approval or denial which may result in the user gaining access to a protected resource according to different access levels or being denied access to the protected resource. User based access control is an illustrative example and other access controls may be based on another entity such as a system or computer application. For example, a computer application may automatically request access to a protected resource to implement a task or routine, for example. The computer application may be associated with a user so that the access may be defined based on both the computer application and the user.

There are many methods and operations for authentication, i.e., identifying or verifying a user's identity. These methods can be used individually or in combination, and fall under three main categories: "something you know" such as a password, "something you have" such as smart cards, tokens, and certificates or "something you are" such as biometrics or other physiological characteristics. Failing to properly authenticate users might lead to imposters posing as legitimate users and accessing confidential information, causing numerous kinds of breaches and increasing risk levels. Authentication is the first layer of protection against unauthorized access, and without it, security mechanisms may not function properly: an imposter that is mistaken for authentic user can be a potential risk for any system. Confidentiality solutions, such as encryption to guarantee the secrecy of information may be ineffective since an imposter would be able to access and decrypt protected data based on access granted to the legitimate user the imposter is posing as.

Although user authentication plays an important role in guaranteeing that only those who are authenticated and pre-authorized are given access, unpredicted and severe security breaches may be committed by authorized, trusted and identified individuals (hereinafter, "insiders").

The United States Computer Emergency Response Team (CERT) Insider Threat Center provides the following definition of an "insider threat": "A malicious insider threat is a current or former employee, contractor, or business partner who has or had authorized access to an organization's network, system, or data and intentionally exceeded or misused that access in a manner that negatively affected the confidentiality, integrity, or availability of the organization's information or information systems." Current authentication methods incur high risks because a recognized identity is not necessarily a guarantee of good intentions by authorized individuals, and authorized individuals may abuse their privileges, voluntarily and sometimes involuntarily, because they may be always trusted (or granted access) by a system until that trust is revoked by a system administrator. Therefore, existing access control systems suffer from the problem that the level of trust in a user is not continuously evaluated or re-evaluated. Instead, the level of trust or access is set at enrollment time and is not changed until an event causes that level of trust to be re-evaluated (e.g., a breach). Another contributing factor to the problem is commonly referred to as the "trust trap", a concept that was introduced by researchers at Carnegie Mellon University. This concept states that "trust increases over time, yielding a false sense of security because the trust leads to decreased vigilance toward the threat". The "trust trap" concept also highlights the risk that a trusted entity might inflict more damage compared to a non-trusted entity simply because detection and prevention techniques are designed to stop outsiders, with minimal consideration given to those who are trusted who have already passed through defense mechanisms—the insiders. Because insiders are often trusted at the time they are committing their crimes, the level of access they have is usually higher than an external attacker; thus, the incidents caused by insiders may be especially devastating. Further, due to the proliferation of digitized assets and the ease of compromising them, the threat of an insider has evolved and the impact has risen.

Examples of breaches caused by insiders which have been reported by the United States Computer Emergency Response Team (CERT) Insider Threat Center, include:
a) Administrator changing all company passwords before termination.
b) Insider deleting all backups.
c) Insider accessing user accounts of previous employer.
d) Insider tests logic bombs before implanting one.
e) Web developer adds pornographic images on company website.
f) Insider forwards company calls to another company.
g) Insider leaks private information on media.
h) Government insider changes a person's data to deceased.
i) Engineer takes source code and demands payment for its return.
j) Insider authorizes payments to third party.
k) Insider intentionally opens a malicious computer file to infect his company.
l) Insider leaks top-secret information about the National Security Agency's (NSA) surveillance as the insider had a high-level of clearance or access.

These are illustrative examples and many other examples of insider breaches exist, including cases of information technology (IT) sabotage, theft of intellectually property, and insider fraud, all of which underscore the shortfalls of conventional access control systems.

A number of methodologies and systems have been used to ameliorate the problem of users abusing their privileges, yet none of these approaches prevent the problem. Such approaches include Data Loss Prevention (DLP), segregation of duties, awareness programs, enforced guidelines, log management. However, DLP is not effective if the administrator is the insider. Segregation of duties becomes ineffective if all parties agree to commit the crime. As for awareness programs and enforced guidelines, they are important, but not sufficient by themselves, and finally as for log management solutions, they are mostly used for auditing purpose, and never as a proactive measure.

Embodiments described herein may provide improved systems and methods for access control.

An IBAC system 200 and method is schematically depicted in FIG. 1, according to some embodiments.

As depicted, the intent 208 of a user 202 is determined by intent detection hardware 204 (including at least one processor) by measuring involuntary behavioral/physiological signals 206 associated with the user 202. The user's intent 208 (e.g., a mal-intent) may be determined by the intent detection hardware 204 based on a user's knowledge of that intent, as detected from the measured behavioral/physiological signals 206. Risk measurement hardware 210 (including at least one processor) may determine a risk level or score 212 associated with a protected resource (object N 216). The IBAC system 200 has access decision hardware 214 to grant 218 or reject 220 access by the user 202 to the protected resource (object N 216) based on the intent level 208 and risk level 212.

In some embodiments, the system 200 measures the existence of a P300 peak of when presenting intent related stimuli. As an example, a system 200 may be configured to track 4 possible intentions and present stimuli that relate to each one of them. The system 200 may detect which one or ones of tested intentions result in a P300 peak, and one or ones that result in P300 peak are then determined by the system 200 to be the potential intention(s) of the user. If no P300 peak is detected, then the system may be configured to register that none of the tested intentions is an intention a user has.

In some embodiments, an intent score may be assigned by an organization deploying the system 200 and the system 200 detects the presence of the intention(s)\by analyzing the physiological signals (e.g., brain signals).

The physiological signals (e.g., a brain signal) determine what intention a user has among possible intentions that are being tested for, the intention that is detected is then assigned the value that the organization has determined in order to calculate an overall risk level. Based on the assigned intent value and the motivation value the risk score is calculated and then based on the risk score access is granted or denied (or differing levels of access, conditions, restrictions can be placed, etc.).

Where there are multiple (or conflicting) intentions determined, the system 200 may be configured to operate based on each intention separately (e.g., independent of one another), based on the aggregate of the intentions (e.g., an intention of burning a facility down may be additive to an intention of stealing documents). In these examples, there may be a standardized metric being used across all intentions that allows the intention scores to be offset, added, subtracted, etc., against one another.

In some embodiments, there may be multiple thresholds applied for intention scores, wherein a first set of intention scores (and corresponding motivation, risk scores) are provided for independently assessed intentions, and an aggregate intention score (and corresponding motivation and risk scores) may be provided on the aggregate of detected intentions. One or both of these analyses may be considered together to improve and/or provide greater context from the perspective of access control.

Motivation may correspond directly to the likelihood that the user carries out his/her intent 208. A motivation level may also be determined from the measured behavioral/physiological signals 206 (by e.g. intent detection hardware 204). The access decision hardware 214 may also grant 218 or reject 220 access to by the user 202 to the protected resource based on the determined motivation level or score.

Motivation may be the cause that pushes or motivates individuals to engage in certain actions. Calculating motivation provides the IBAC system 200 a second dimension of calculating the risk of access to the protected resource or risk level 212. For example, a high-risk malicious intention with low motivation results in low risk, since the probability of the intention being executed is low. On the other hand, a medium-risk malicious intention with high motivation results in high risk, since its probability to occur is high. Experimental results have indicated that various physiological signals 206, such as the P300 signal amplitude, may be useful in (1) detecting intention/motivation in users, and (2) differentiating between users having differing levels of motivation (e.g., in experiments that involved hesitation). For example, a motivation score may be detected at least using a measurement of a P300 amplitude peak height.

For example, in some embodiments, based on their detected characteristics, users may be segregated into various groups based on their assessed motivation, such as "not motivated, motivated and highly motivated". As noted later, experimental results indicate that motivation levels can be computed and that if a user is motivated, his or her brain signals are associated with a stronger signal than in those who are not motivated.

In some embodiments, the existence of the P300 peak with respect to the stimuli representing the intention may be indicative of what intention as user has, and the P300 amplitude may be indicative of the motivation level a user has in association with that intention. The system 200 may be configured to provide and/or deny access based on these detected values, among others.

In some embodiments, a number of stimuli are provided per intention (e.g., 16 or a lower number), each stimuli may be shown for a duration (e.g., 1 second).

As a specific example, the system 200 may be configured to present a series of stimuli to a user to detect what an intention is. The system 200 then detect that the user's intention (e.g., by indicating that there is indeed a P300 response in association with the various intentions) is to damage the facility, which is an outcome that an administrator has previously assigned a value of 20 to. The system 200 then measures the peak of the P300 and assigns a motivation score of 0.5.

Using the motivation score and the value assigned to the intention, the system 200 then calculates a risk of access, 20*0.5=10, and because this is below a threshold of 15, the system 200 permits access.

The risk level 212 associated with granting access is calculated by the risk measurement hardware 214, and based on the calculated risk level 212 and risk accepted threshold, a decision to grant 218 or reject 220 (or deny) access to the protect resource object N 216 is made by the access decision hardware 214.

In some example embodiments, the physiological signals 206 may be received in relation to one or more stimuli presented to the user 202. The stimuli may be electronic assets that may be classified or categorized using metadata and the like. For example, an image or audio file may be presented to the user 202 as stimuli where the image or audio may depict positive or negative content which may be linked by the classification or categorization. The physiological signals 206 may be evaluated and processed by the intent detection hardware 204 along with the classification or categorization of the stimuli (or other meta data about the stimuli) to determine a response to a particular type of stimuli, for example. The positive or negative content may depict an event for example, and the physiological signals 206 may be evaluated to measure one or more event-related potentials indicative of response of the user 202 to the stimuli presented to the user 202.

Conveniently, unlike identity-based control systems, embodiments of the IBAC system 200 and method disclosed herein address risks associated with an insider attack. In particular, the IBAC control system 200 and method disclosed herein denies access requests from a previously trusted entity that has become malicious or has the intention of abusing his or her privileges based on the intent level 208 and motivation level, for example.

Conveniently, embodiments of the IBAC system 200 and method disclosed herein take into account a reason for an access request when deciding whether or not to grant that request. The reason may be determined and evaluation based on the intent level 208 and motivation level 210, for example.

Conveniently, embodiments of the IBAC system 200 and method disclosed herein executes automatically using particularly configured hardware and electronic data sign exchange to provide improved efficiency, as no human interaction, e.g., interrogation of users, is required to determine a user's reason for an access request.

Conveniently, embodiments of the IBAC system 200 and method disclosed herein provide improved security as involuntary behavioral/physiological signals 208 may have inherent validation as they may be difficult to mimic or falsify.

Conveniently, embodiments of the IBAC system 200 and method disclosed herein may be used in scenarios in which the identity of a user is not as important as the actual intention of the user. For instance, there may be no need to know the identity in the case of a stadium, a hospital, government public office, a shopping mall, or the like, etc. These places are in general open to anyone, except those who have bad intention toward the place. As such, embodiments of the IBAC system 200 and method disclosed herein may provide an effective counter-terrorism tool where terrorism may be detected based on the intent level and motivation level.

Conveniently, embodiments of the IBAC system 200 and method disclosed herein may be used in conjunction with identity-based access control systems in scenarios in which the identity of a user is important (e.g., access to private facilities, border crossings, etc.). In such scenarios, the IBAC control system and method disclosed herein may provide an important second layer of defense.

Conveniently, embodiments of the IBAC system 200 and method disclosed herein provide a proactive solution to address insider threat. In contrast, conventional systems may have reactive approaches, meaning that organizations wait for an incident to happen and then react to the incident by e.g. building signatures of the incident and then add an incident-specific policy or mechanism to prevent the incident from happening again. Yet in the case of an insider threat, the first incident may result in massive destruction to an organization that it may not be able to recover from. Further, as security specialists continuously analyze security incidents to develop countermeasures, attackers continuously update their attack tactics as well.

A potential benefit may be that a practical amount of stimuli may be needed to provision this type of access control. The stimuli may be presented to the user in a reasonable amount of time. For example, some other approaches may require an overly intrusive or cumbersome amount of time to present stimuli (e.g., 5-25 minutes), which may not be reasonable in the context of many applications. In some embodiments described herein, a single or a few stimuli are used, for example, visual images, olfactory smells, audio, tactile sensations, etc.

In an embodiment, the behavioral/physiological signals from which a user's intent is determined are electroencephalogram (EEG) signals, which are electrical signals that result from neurons firing in the brain. These may be referred to as brain signals. In particular, the user's intent may be determined from an event-related potential (ERP) of EEG signals in response to stimuli presented to the user, and specifically the ERP known as the P300 signal (or P300 wave) for illustrative example embodiments. Generally speaking, EEG signals are involuntary, and thus may be difficult to mimic or falsify.

The P300 signal is an ERP that is a positive waveform that is emitted by a user's brain 300 millisecond after a stimuli onset. Accordingly, the behavioral/physiological signals (or segments thereof) may be time-coded or time-stamped to match or correlate segments of the physiological signals to timing data related to the presentation of stimuli. EEG reaction to stimuli (as measured by the physiological signals) may be used to establish familiarity of the user with the presented stimuli because a memory recall elicits a P300 peak. The familiarity of the user with the presented stimuli may be used to determine the intent level or motivation level, for example. The P300 amplitude (typically, 2-10 µV) is sensitive to the amount of attention resources that are engaged, and P300 latency which is about 250 ms to 500 ms is sensitive to the amount of time required for recognition. An example of a memory recall is showing a person an image of her/his home, which results in a P300 peak that may be detected from EEG signals.

Figure 2:
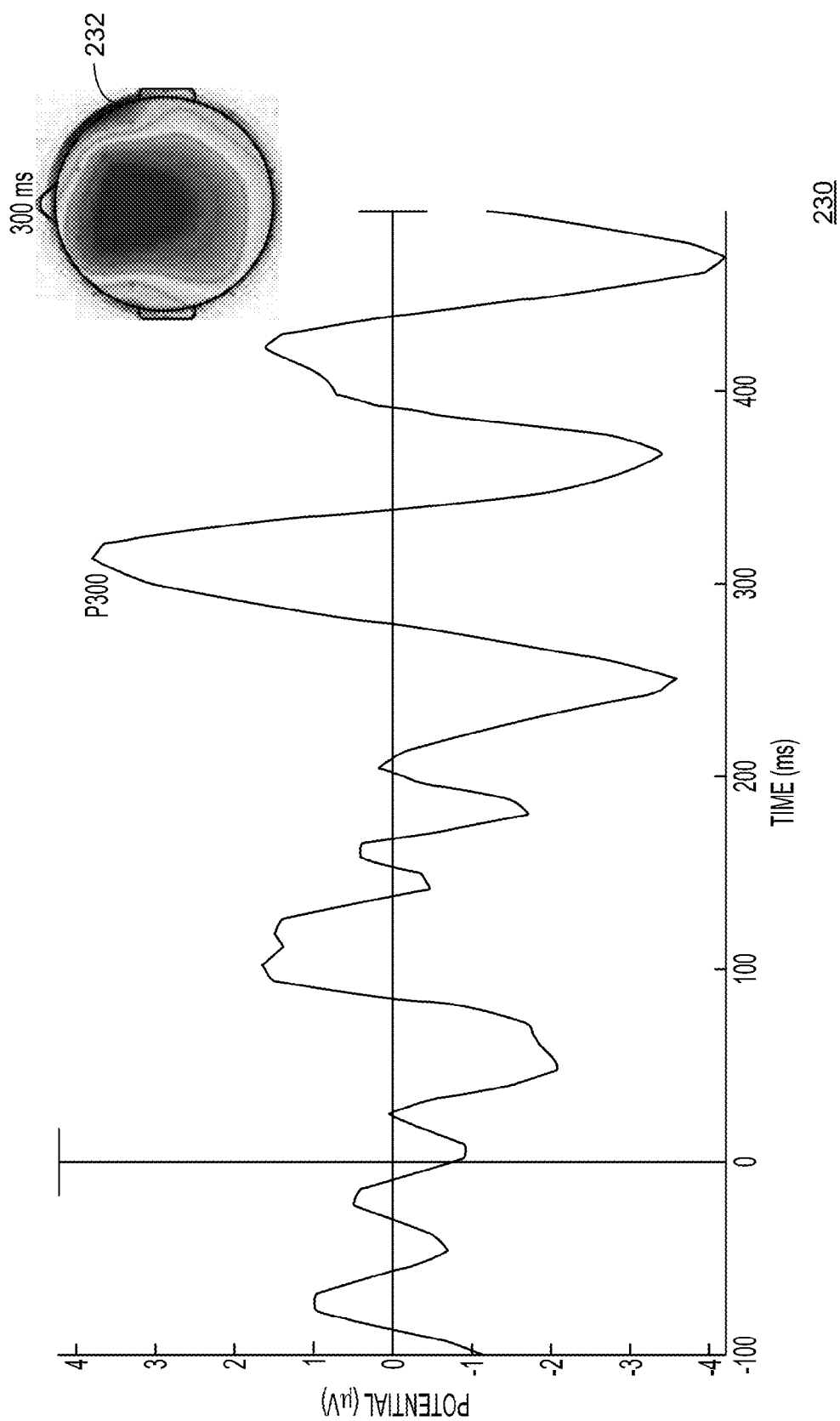
FIG. 2 illustrates an example P300 signal, according to some embodiments.

FIG. 2 depicts an example graph 230 of a P300 wave including a heat map 232 at a given time point or period depicting various physiological signals for a head of the user. As depicted, a P300 peak occurs approximately 300 ms after a presented stimuli triggers memory recall. This peak may occur at or around 300 ms, for example, at 300 ms, within a range of 100 ms, 50 ms, 25 ms, 10 ms, 5 ms, 2 ms, from 300 ms, etc. In some embodiments, the P300 peak may occur sometime between 250 ms to 500 ms.

An intention may be an explicit conscious decision to perform an action. Intentions are deliberate, and forming one is an automatic process. An intention leads an agent (e.g. user) to perform the action. Intentions have stability, and once formed, an intention often has a tendency to persist. Because of that, a reaction towards stimuli that present a view of an intended action may reveal that intention in the form of a P300 peak, which shows recognition of the intended action. Accordingly, stimuli may be classified or characterized based on an intended action depicted thereby.

Because a user knows his/her intentions of access to protected resources, that knowledge can be detected using their brains' reactions (captured as physiological signals) to visual stimuli, upon stimulating their brains with the question "what is your intention of access?" or other depicted intended action.

Thus, the ERP provides information about the existence of knowledge about an intention or intended action which may be used to determine the reason of an access request. The ERP also provides information about the motivation level towards an intention that may be used to detect the likelihood of intention execution, which, as detailed herein influences the access risk level.

The IBAC system and method disclosed herein provides an ability to deny access to those who show a mal-intention (based on the physiological signals) and to grant access to those whose brain signals shows no knowledge about that mal-intention.

Further, as knowledge about a user's intention to execute an action does not necessary guarantee that the action will be executed, a measure of the user's motivation to execute that intention may be obtained to determine a likelihood of the intention being realized or acted upon. As detailed below, the motivation level accompanying knowledge about an intention may be detected using the P300 amplitude, which reflects the determination of the user to act on the detected intention.

In some embodiments, the IBAC system is configured to further detect the motivation associated with a user to conduct a particular activity or intention. The motivation may be determined, for example, from various physiological factors, such as the P300 amplitude.

The Fogg Behavior Model (FDM) asserts that for a target behavior to happen, an intention being executed, a person must have sufficient motivation, sufficient ability and an effective trigger. Based on this model, the probability of a target behavior to be performed depends on the motivation level and the ability level of the potential perpetrator. Since insiders generally have high ability to abuse their privileges, the condition of sufficient ability is likely met. An effective trigger occurs when an intention exists and access is granted, and with sufficient motivation, the target behavior is performed. Accordingly, in some embodiments, the combination of intention and motivation detection are used to determine a grant or rejection of access to the protected resources.

Figure 3:
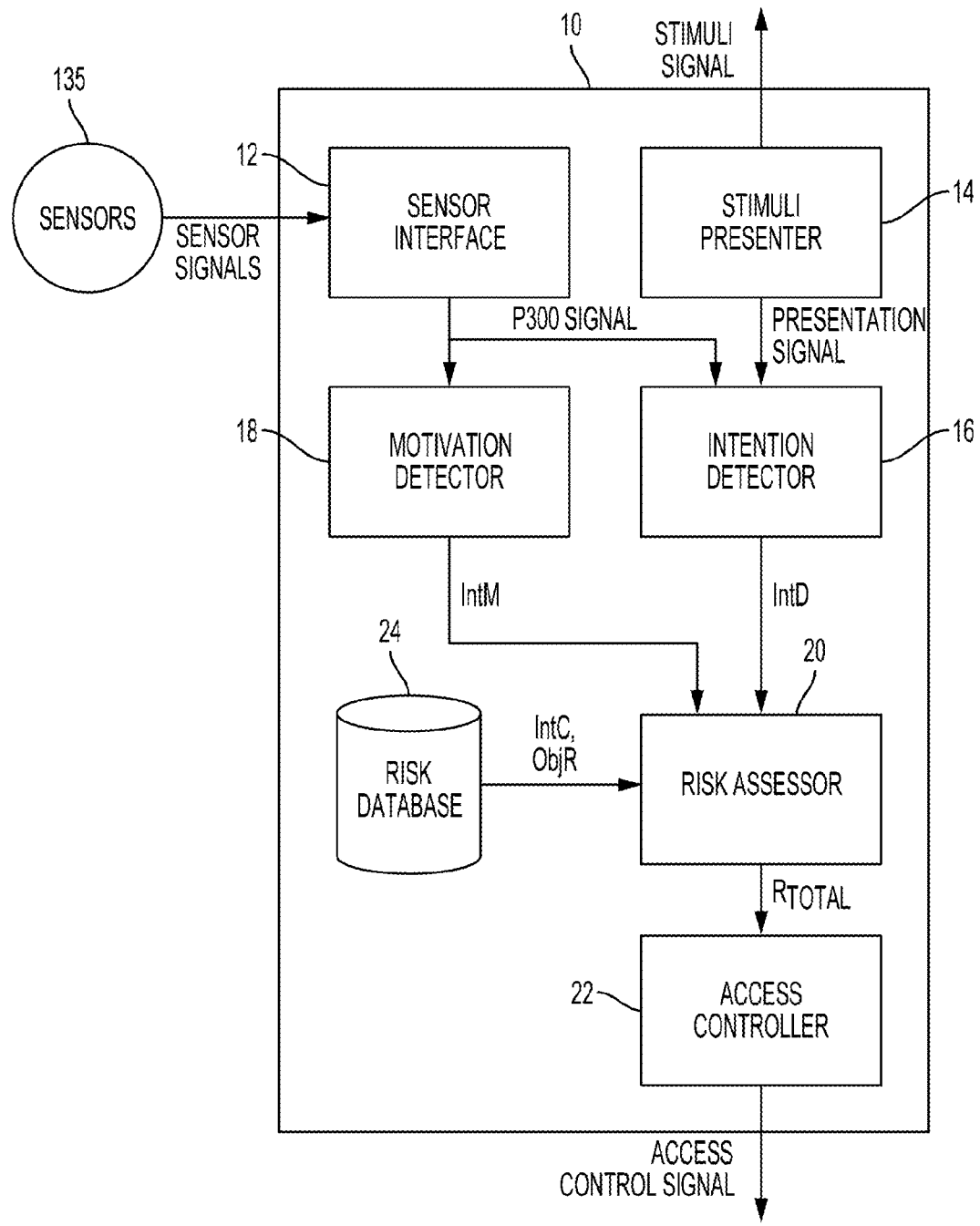
FIG. 3 is a schematic diagram of the intent-based access control system and method of FIG. 1, according to some embodiments.

FIG. 3 depicts the implementation of another IBAC system 10, according to one example embodiment. As depicted, IBAC system 10 includes a sensor interface 12, a stimuli presenter 14, an intention detector 16, a motivation detector 18, a risk assessor 20, a risk database 24, and an access controller 22. The IBAC system 10 and components thereof may correspond to IBAC system 200 of FIG. 1 and components thereof.

The IBAC system 10 may be configured to provide various intent-based access control mechanisms, including for example, controlling access to documents, financial systems, gaming systems, advertising systems, etc. The IBAC system 10 may be used in various applications where security is important, and a potential benefit may be that the identity of the user may not be necessary in providing intent-based access control.

In an embodiment, the sensor interface 10 may be used, for example, in receiving, from a user, one or more electronic signals representative of a request to obtain access to a protected resource. The intention detector 16 and motivation detector 18 may be configured for monitoring one of more physiological signals associated with the user, the one or more physiological signals including at least brain signals. The stimuli presenter 14 may be configured for presenting stimuli to the user, the stimuli adapted to evoke a physiological or behavioral response. The stimuli may depict intended actions and may have a classification or categorization based on the intended actions (as per an electronic data structure field or tag identifying the classification or categorization). The sensor interface 12 may be configured for measuring one or more event-related potentials in the monitored one or more physiological signals. The intention detector 16 and motivation detector 18 may be configured for processing the one or more event-related potentials to detect signals indicative of (i) a potential intention of the user and (ii) a potential motivation of the user. The intention detector 16 and motivation detector 18 may then be configured for processing the one or more event-related potentials to assign (i) an intention score based at least on the detected signals indicative of the potential intention of the user and (ii) a motivation score based at least on the detected signals indicative of the potential motivation of the user. The risk assessor 20, optionally in conjunction with a risk database 24 may be configured for determining a risk score associated with the protected resource based at least on the intention score and motivation score in relation to an impact of malicious access to the protected resource. An output may be provided to the access controller 22, which may then be configured for determining whether the request to obtain access to the protected resource should be granted or denied based at least on a combination of the intention score, the motivation score, and the risk score.

In some embodiments, the IBAC system 10 may be utilized in conjunction with various user profiles associated with the access control for one or more users. For example, if the user that obtains access to the protected resource is associated with an intention score above a first pre-defined threshold and a motivation score above a pre-defined threshold, the IBAC system 10 may be configured for toggling an electronic flag in an electronic profile associated with the user to indicate that the user should be monitored for a pre-defined period of time to detect a future potential motivation. This scenario is provided for the example where the system may allow provisional and/or monitored access in relation to a user that may not be entirely trustworthy.

In some embodiments, the IBAC system 10 may be utilized in conjunction with various user profiles associated with the access control for one or more users. For example, if the user that obtains access to the protected resource is associated with an intention score above a first pre-defined threshold and a motivation score below a pre-defined threshold, the IBAC system 10 may be configured for toggling an electronic flag in an electronic profile associated with the user to indicate that the user should be monitored for a pre-defined period of time to detect a future potential motivation. This scenario is provided for the example where the system may allow provisional and/or monitored access in relation to a user that may have an assessed intention but not an assessed motivation. For example, this user may be tracked and/or monitored to ensure that the motivation does not arise over time—a user with a mal-intent may therefore be flagged as a risk but allowed to proceed. The IBAC system 10 may use historical data about the user (including historical intention levels and motivation levels) in combination with a current intention level and a motivation level to grant or deny access to a protected resource.

Example descriptions of each of the components are provided herein. Variations on the components are possible and there may be less, more, and/or different components.

Sensor interface 12 is adapted to receive physiological or behavioural signals from one or more sensors 130. In particular, sensor interface 12 may be adapted to receive EEG signals from one or more sensors (electrodes) 130 positioned on a user's head.

Sensor interface 12 may include one or more analog-to-digital converters to convert any analog sensor signals to digital form and demodulators, filters, and so on, for signal processing.

Sensor interface 12 may include a combination of filters and signal processors to condition received signals to remove noise and/or signal artifacts. For example, raw EEG signals may include environmental artifacts such as cable noise, biological artifacts such as electrocardiogram (ECG) signals, which are heart signals, electromyogram (EMG) signals, which are electrical signals that result from muscle movements, and electrooculography (EOG) signals, which are electrical signals that result from blinking and eye movement. Sensor interface 12 removes such artifacts. Sensor interface 12 provides the processed signal to intention detector 16 and motivation detector 18.

Sensors 130 may be EEG electrodes suitable for measuring EEG signals such as P300 signals.

As will be appreciated, to improve signal quality, in operation EEG electrodes should be placed in proximity to where signals are generated. So, when the EEG signal of interest is a P300 signal, sensors 130 should be placed in locations suited to obtain the P300 signal, e.g., locations proximate the central regions of the brain, such as the Fz, Cz, and Pz locations.

In embodiments in which multiple electrodes are used, identification of the best electrode (e.g., best for a particular user and/or a particular environment) eliminates the need to process the output of other electrodes. Such elimination improves processing efficiency, and therefore conveniently reduces intent detection time.

In one specific example embodiment, sensors 130 may be Emotiv™ EPOC electrodes distributed by Emotiv™ Systems (Eveleigh, Australia). In another embodiment, a single Emotiv™ Insight electrode distributed by Emotiv™ Systems may be used.

Stimuli presenter 14 is adapted to present stimuli to a user to evoke a physiological or behavioural response (e.g., a P300 peak). The stimuli may depict an intended action which may be used to determine potential intentions and motivations for the depicted action, for example. So, stimuli presenter 14 may be used to present stimuli corresponding to a mal-intent of the user, allowing the evoked physiological or behavioural response to be measured (e.g., by way of sensors 130 and sensor interface 12).

Stimuli presenter 14 may be adapted to present visual stimuli (e.g., pictures or video) on a computer display. To this end, stimuli presenter 14 may transmit a stimuli signal (e.g., a video signal) to a computer display. Stimuli presenter 14 may also be adapted to present textual stimuli, audio stimuli, or any other form of stimuli, instead of or in combination with visual stimuli.

In some embodiments, the intention detector 16 and the motivation detector 18 are provided as part of an intention and motivation detector component, which, for example, may be configured to receive various physiological inputs. As an example, the component may be configured to receive input from non-invasive sensors that are attached to the user's head. Once the physiological signals are obtained, they are filtered, classified, and analyzed to detect the intention and the level of that intention (motivation level). The component may be configured to provide and/or process various information, providing outputs including, for example, the intention category that is detected from a set of possible intentions. Each intent category may be assigned a value that influences the overall risk, and the intent category value assignment may depends on the resources that the system is protecting and, as such, assigning the impact value of an intent may be done, for example, by an organization. A motivation level may also be provided which relates to the likelihood of an intent being executed.

Intention detector 16 detects whether the user possesses a given intent (e.g., a mal-intent). The given intent is determined to exist if upon stimulating the user with stimuli associated with the given intent (e.g., showing the user an image of setting a laboratory on fire), a physiological or behavioural response (e.g., an EEG signal) is measured which indicates that the user has that given intent. For example, the given intent is determined to exist if the presented stimuli triggers a P300 peak.

A P300 peak may be detected by comparing the amplitude of the P300 wave against a pre-determined threshold. In particular, the amplitude of the P300 wave approximately 300 ms after presenting the stimuli may be compared to the pre-determined threshold.

An assessed intention may be provided in the form of an intention score, which may be a numerical value that may be normalized, standardized, etc.

Intention detector 16 produces an output IntD (FIG. 3) that has a value of 1 when a given intent is detected, and a value of 0 when the given intent is not detected.

Motivation detector 18 is adapted to determine the motivation level of the user once an intention is detected by intention detector 16. The motivation level may be provided in the form of a risk score, which may be a numerical value that may be normalized, standardized, etc.

Intentions may be highly driven by the motivation level that accompanies the detected intention, the motivation level may be used to determine the probability of an intention to be executed or the probability to act on the potential intention. That is, the potential motivation of the user may be the motivation of the user to act on or carry out the potential intention. The motivation level may reflect the probability or likelihood of the potential motivation of the user to act on or carry out the potential intention.

In some embodiments, motivation levels can be detected by analyzing the P300 signal amplitude that occurs when an intention is recognized and detected. In some embodiments, the P300 is the single measurement that is being conducted for both intention detection and motivation detection. For example, the P300 amplitude may be associated with the amount of attention paid by the user, and the motivation may be correlated to the attention. For example, information presented to participants that relates to a concealed piece of information about an intention that they intend to execute may lead to the participants paying more attention, and consequently having a higher P300 amplitude. Conversely, presenting information to participants that relates to concealed information about an intention that they do not intend to execute may not have the same result. In this way, attention level may correspond to the motivation level.

In an embodiment, intention motivation level, IntM, is computed as:

$$IntM = \text{Amplitude}(P300). \tag{1}$$

In other words, the intention motivation level is the amplitude of the P300 signal. Motivator detector 18 provides IntM as an output.

Risk assessor 20 is adapted to assess the risk level associated with the types of intentions that are detected and the detected motivation level of each intention. Risk assessor 20 receives as inputs IntD from intention detector 16, and IntM from motivation detector 18.

First, an intention risk (IntR) is computed as:

$$IntR = \frac{\log(IntC^{IntM})}{2}, \tag{2}$$

where IntC is the general intention category pre-defined risk level, which ranges in value between 0 and 100. IntC may be assigned a high value for intentions that are particularly damaging. For example, the intention of setting a laboratory on fire may be assigned a value of 90. In contrast, IntC may be assigned a lower value for less damaging intentions, e.g., stealing laboratory supplies. The values of IntR for various protected objects may be set and tuned by an operator of an IBAC system. IntM in Eq. (2) is the intention motivation level from motivation detector 18. The term "object" is used broadly to include item, location, information, person, or anything else to be protected.

The maximum value of IntR as calculated by Eq. (2) is 100.

The total intention risk is computed as follow:

$$R(\text{Intent})_{total} = IntR + ObjR \tag{3}$$

where ObjR is the object risk that is predefined.

ObjR may be assigned a value proportional to the sensitivity of the protected objects(s). For example, if the protected object is a sensitive document, ObjR may be assigned a relatively high value (e.g., 80). In contrast, if the protected object is a room without sensitive information, ObjR may be assigned a lower value (e.g., 50). The values of ObjR for various protected objects may be set and tuned by an operator of an IBAC system. ObjR's value is between 1 to 100. The R(Intent)$_{total}$ maximum value of 100 indicates high risk if access is granted to the user that has the detected intention.

The pre-defined values of IntC for various intent categories may be stored in risk database 24, and retrieved therefrom by risk assessor 20. Similarly, the pre-defined values of ObjR may be stored in risk database 24, and retrieved therefrom by risk assessor 20. Database 24 may be a database (e.g., a relational database).

The overall risk is computed as follows:

$$R_{total} = \frac{IntR + ObjR}{100 + ObjR} 100 * IntD \tag{4}$$

The risk assessor 20 provides R$_{total}$ as an output.

In some embodiments, risk may also be determined as the total risk, wherein $R = P(\text{Loss}) = \text{Loss}$ and the probability of Loss is measured by the motivation level.

$R = \text{Motivation level} * \text{Loss}$

A Loss value may be determined equal to the cost of vulnerability of an asset if exploited (intention executed); for example, R=Motivation level*Intention category value.

In some embodiments, motivation levels are provided as (or normalized as) values between 0 and 1. The intention category value may be configured to have values between 0 and 100. The motivation levels may, for example, be detected by the P300 amplitude, and the intent category may be detected by the intent detection component.

In some embodiments, the intent category value may be determined by the asset owner. The result of total risk may be a percentage between 0 and 1:

$$R = \frac{(\text{Motivation level} * \text{Intention category value})}{100} \quad (5)$$

The access controller 22 receives Rtotal as an input, and uses this value to determine whether or not access to a protected object should be granted, based on an accepted risk level for that object. So, access controller 22 may compare Rtotal to a pre-defined risk level threshold.

For example, after calculating the total risk of a specific intention toward a particular asset with a specific motivation, the system may be configured to provide an access decision based on the overall risk.

However, basing the access decision on overall risk alone may be misleading, as a low percentage risk may result in a wrong access decision unless the asset value is also taken into consideration. Therefore, in some embodiments, the risk assessor 20 assesses risk as follows:

Total Estimated Loss=$R$*Asset value

The Total Estimated Loss is the value provided to the decision-making component to decide whether to deny or to permit access to protected assets.

As a further example, if motivation level is 1 and the cost of an asset if exploited (intent) is 100, then risk on asset will be $$\frac{(1 * 100)}{100} = 1$$

out of 1 risk if access is granted, which means that the probability of losing 100% of the value of the asset is 100%. The total possible loss if the asset value may be $1M=1*$1M=$1M loss.

As another example, if the motivation level is 0.5 and the cost is 100, then total risk is $$\frac{(0.5 * 100)}{100} = 0.5$$

out of 1 risk if access is granted, which indicates the probability of losing half of the value of an asset. The total possible loss as per equation (6) if the asset value is $1M=0.5*$1M=$500K.

If access controller 22 grants access, e.g., if $R_{total}$ is below the pre-defined threshold, an access control signal may be generated and transmitted to effect the grant of access. The access control signal may be a signal to a mechanical actuator (e.g., to unlock a door), a software signal to grant access to electronic documents, and so on. In some embodiments, when access is denied, access controller 22 may automatically issue an alarm (e.g., to security personnel or government authorities).

As an example, the access controller 22 may determine whether access should be granted through an analysis of the estimated loss of value in an asset and the threshold of accepted value loss in an asset. For example, if $10,000 value is the threshold of accepted loss in an asset, any total estimated loss that is above that threshold would result in access being rejected, and any total estimated loss that is below that threshold would result in access being granted.

Access control may be provided at different levels of access (e.g., tiers of security access), and different levels may be assigned based on at least one of assessed intentions, motivations, and risk scores. Access may be provided having different characteristics, such as temporary access, monitored access, limited access, restricted permissions (only read, only write, no deletions), etc.

In an embodiment, IBAC system 10 may be configured to perform detection according to an adapted version of the Concealed Information Test (CIT), also known as the Guilty-Knowledge test. In particular, stimuli is presented representing an irrelevant act (innocent intent), referred to as a "probe". The probe may represent an intended action. Then stimuli is presented representing a prohibited act (e.g., mal-intent), referred to as a "target". The target may also represent an intended action.

A user without the mal-intent may not differentiate between the "probe" and the "target", i.e., the P300 peaks would be similar in height. However, a user with the mal-intent would show a difference, e.g., a greater P300 amplitude. Users with the mal-intent can thus be determined.

Figure 4:
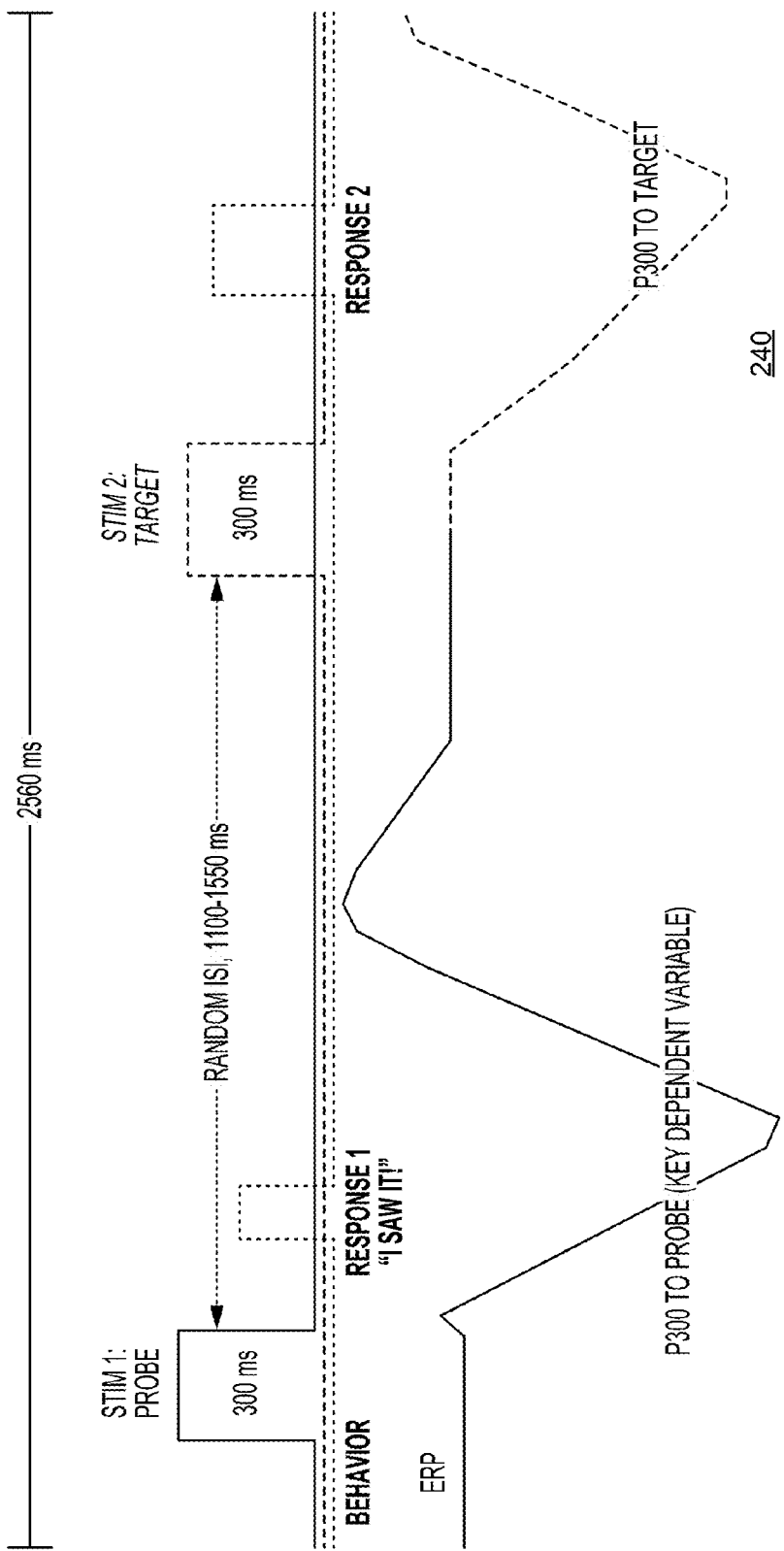
FIG. 4 illustrates an example P300 signal obtained using the Complex Trial Protocol, according to some embodiments.

In an embodiment, IBAC system 10 may be configured to perform detection according to an adapted version of the Complex Trial Protocol. In particular, stimuli is presented representing a "probe" followed by either a "target" or a "non-target" stimuli with an interval of 1100-1550 ms. In this case, "probe" refers to a prohibited act possibly known to the user, "target" refers another prohibited act unknown to the user, while "non-target" refers to an irrelevant act. FIG. 4 depicts an example graph 240 of a P300 response measured according to the Complex Trial Protocol. If the P300 amplitude is higher in the "category" than the "target" or "non-target" categories, knowledge of the "probe" (the prohibited act) is detected.

Experimental Results

Test results for IBAC system 10 obtained through two experiments are discussed herein. These experiments are described for illustrative purposes.

Participants of experiment 1 had a prohibited intention of burning a laboratory, but not the motivation to do so. Meanwhile, participants in experiment 2 had a prohibited intention and motivation of opening private files.

The results showed that for each participant, a P300 peak was triggered only upon presenting stimuli representing burning the laboratory (in experiment 1), and upon presenting stimuli representing opening private files (in experiment 2). As such, by applying a threshold to the P300 signal, the prohibited intention may be reliably detected.

The first experiment, Experiment 1, explores the possibility of intent and motivation detection following the single-blind experimental design, which is when the subject does not know the tested intention categories, but only the experimenter knows. Participants were requested to have a specific intention that they do not aim to execute, using a hesitation-based study of motivation, and then to test the possibility of detecting that intention with analysis of the data.

The second experiment, Experiment 2, also delivers the possibility of intention and motivation detection. The second experiment follows a double-blind experimental design, which is when both the subject does not know what intentions they are tested for and the experimenter does not know what intention a subject has among the tested intentions of access, while applying a method of verifying the real intention of a user in order to match the detected intention with the real intention. Also, Experiment 2 delivers the difference in motivation in a real-life insider threat scenario, compared with the first experiment, since, in Experiment 2, participants choose an intention to execute, which uses intrinsically-based motivation. This indicates higher motivation levels compared with the first experiment, which employs extrinsically-based motivation.

Subsequently, the data from both experiments were used as input into the IBAC model for risk assessment and access decision. The analysis of the first objective, intent detection, in both experiments follows a within-subject analysis, detecting intent among possible intent categories. The analysis of the second objective, motivation detection, in both experiments follows a between-subject analysis, differentiating the motivation level between hesitation-based intention, where intent is not executed, and motivation-based intention, where intent is executed.

It is expected that all participants in the first experiment are to have a malicious intention being correctly detected, but with low motivation, resulting in low risk and access being granted. In contrast, in the second experiment, it is expected that a malicious intention will be detected along with the high motivation, causing the risk to be high and access to be rejected. The element that confirms motivation level is the post-access monitoring action that a participant performs. If an intention is executed, then motivation should be detected to be high, since low motivation implies less probability of execution of a detected intention. Table 1 shows the research questions of Experiments 1 and 2 in relation to Objectives 1 and 2.

TABLE 1

Experiments 1 and 2 in relation to Objectives 1 and 2.

| Addressing | Experiment | | |
| --- | --- | --- | --- |
| | Experiment 1 Single-blind (Hesitation-based) (Request specific intent) | Experiment 2 Double-blind (Motivation-based) (Provide freedom of choice to commit a mal-intent, realistic) | Experiments 1 and 2 Overall analysis |
| Objective 1 (Intent Detection) | Can intentions be detected when a specific task is requested? | Can intentions be detected when chosen freely? | Can intentions be detected in both conditions? |
| Objective 2 (Motivation Detection) | Can motivation levels be detected? Are they low or high in comparison with Kleih's work? | Can motivation levels be detected? Are they low or high in comparison with Kleih's work? | Can motivation levels be detected in both experiments? Are they similar or different? |

Experiment 1: General Intent and Motivation Detection with an Expectation of Intention not to be Executed (Hesitation-Based).

Experimental Goal:

This experiment is intended to detect the subject's current thoughts toward a specific resource, to further use that information as an input for the access control mechanism. If a participant is thinking of a future plan, past memory, or any thought related to a resource, then the thought is detected when the brain recognizes an image that represents that thought. If a participant is thinking of what they intend to do in relation to that resource, then it is a detection of their intentions. A reaction to stimuli that present a view of the intended action would reveal that intention by showing a P300 brain spike, which reflects recognition of the intended action.

This experiment is intended to detect an extrinsically-based intention, which is an intention imposed on participants to have, among non-target possible intentions that participants do not know exist within the system. This experiment is designed to achieve Objective 1, intention detection, and Objective 2, motivation detection, in a hesitation-based experiment design.

Subjects:

A group of 20 participants, both male and female, aged between 18-40 years, participated in the experiment, and were ensured that they were capable of participating in the experiment prior to signal acquisition. All electronic devices were put away to ensure that the signals are not affected by external sources, and all subjects participated voluntarily with no compensation.

Procedure:

The context of the experiment is to deny a person access to a resource if he or she has projected specific malicious intentions about the use of that resource. For the experiment, the action of access was chosen relating to a physical resource (a specific restricted laboratory room). Only having good intents of access such as to study, help, or organize should result in granting access. Having the malicious intention of burning the lab should result in access being denied.

Participants in the experiment were asked to have on their mind the malicious intention of burning a lab while looking at random images that they had never seen before. Various pictures were shown to the participant, including pictures to represent studying and organizing, and pictures showing the lab being set on fire. The investigators then looked to see whether the burning lab pictures triggered any P300 signal, which would indicate a malicious intention toward that space. A P300 signal that is elicited during the showing of images of a person studying, helping someone in, or organizing the lab indicates good intents of access and results in the access request being granted.

Criteria for Selection of Images:

The selected images were chosen so that each image represents an intention. The selection criterion starts by selecting tested intentions (burn lab, study in lab, organize labs, and help study in lab), and continues by choosing images, which is accomplished by searching the name of an intention (e.g. to burn the lab, to study in the lab, to organize the lab, and to help study in the lab). Once the images were selected, the investigators conducted a survey distributed to 10 participants who did not participate in the actual experiment, to write what they thought the intention was supposed to be while looking at the images. Only images that received assessments of 90% agreement and above stating that they represented an intention of burning, studying, organizing or helping were selected for the study. This ensures that images depict the category of intention that they are intended to represent, as well as eliminating the possibility of bias. Image selection could result in better accuracy, especially in the case of a specific intent detection. However, this is subject to experimentation in this area. Images could be abstract, as in the use of "malicious intent" vs. "good intent" texts to detect if an intent is malicious or good; however, using such an approach would not determine the exact category of intent, but only the direction of an intent. Each approach is valid for a specific context of deployment, whether it is a public area access or a highly secure facility access.

Test Environment:

To measure physiological responses of the participant to various images, Emotiv EPOC, a wireless 14-channel EEG acquisition device, was used at a sampling rate of 128 Hz. The investigators used the channels locations AF3, AF4, F3, F4, F7, F8, FC5, FC6, P7, P8, T7, T8, O1, and O2 following the 10-20 standard of electrode placement.

Participants completed the experiment using a custom system developed to deploy the test and to gather responses from the participants. Participants were first introduced to EPOC before being fitted with this device. The setup was then tested (for approximately 1 minute) to ensure that there was a good signal from the electrodes. EEG data were collected at two times during the experiment: during the baseline and while presenting stimuli. The baseline and reading of stimuli sessions were timed to record precisely for two minutes. Each participant session was recorded as follows:

Following the methodology of P300-based CIT (Section 2.4.3), participants first read the instructions of the experiment that states that they are asked to intend to burn a lab. A quiet environment was used in order to detect whether the investigators' hypothesis was correct or not, without any outside factors that may result in reactions that may mislead the study. However, in future experiments, it should be taken into consideration that the deployment of the access control may not be as quiet. Subsequently, participants were shown their intention in a text statement. This was used to familiarize participants with their intention and to remind them of their intention. Then, the baseline was recorded for one minute. During the baseline phase, participants were asked to relax and were shown a black screen. It was ensured that there was no reflection on the screen. Subsequently, 64 image-based stimuli flashed: 16 stimuli from a target category, which were images that reflect the user's intention, and 48 stimuli from a non-target category, which were images that reflect the user's possible intentions. In this experiment, image stimuli are random pictures of fire, burning papers, and burning books in the target category, and in the non-target category, images were used of random university labs and students studying. Because short intervals between target stimuli produce small P300 components, the investigators decided that each image should last for 1 second for a session that lasts for 64 seconds, with no inter-stimulus interval. The pattern of flashed stimuli included 3 images from the non-target category and then 1 image from the target category, where each intent category was shown after the every other intent category had been presented.

Experiment 2

The aim of Experiment 2 was to investigate the possibility of insider threat detection using Intent-based Access Control (IBAC). The methodology applied was intended to detect the existence of an intention to abuse privileges and to detect the specific resource related to the user's plan to commit maleficence. This experiment aimed to detect an intrinsically-based intention, which is an intention that participants choose to have, among possible known intentions, without informing the investigators of what intention they have. This experiment was designed to achieve Objective 1, intention detection, and Objective 2, motivation detection, using a motivation-based experimental design.

Subjects:

A group of 10 university students, both male and female, and aged between 18-35 years, participated in the experiment, and were ensured that they were capable of participating in the experiment prior to signal acquisition. All electronic devices were put away to ensure that the experimental signals were not affected by external sources, and all subjects participated voluntarily with no compensation.

Procedure:

Each participant was informed that an important email was sent to all students by the academic advisor to streamline the registration of courses for the next semester. The academic advisors requested students to update their information as soon as possible, and the students were informed that in an hour the system would stop accepting any responses, which would result in problems in their registration. Participants were told that this would require a wired access to the network for them to be able to update their information, and that the investigators were willing to provide them access to the personal system only if they did not access a folder named "Personal." The participants were informed that the Personal folder contains private pictures, bank username and password information, critical governmental information, and a diary. Participants were told not to access any of the files unless they could do without getting caught. If they agreed, the investigators then provided them with the laptop to update their information. If they were caught accessing the private information, the investigators informed them that the investigators would end the experiment, as they had failed to open the files without the investigators' knowledge. Participants were told not to tell the investigators which file they had opened even after the experiment was complete. Once the participants agreed, the investigators started the experiment. The experimental flow and methodology followed that described for Experiment 1 of showing images that represent four possible intentions: opening the private pictures folder, the bank username and password folder, the critical governmental information folder, or the diary folder. If there was no recognition of any of the categories, then access can be granted.

Criteria for Selection of Images:

The criteria for image selection followed the method of Experiment 1 of selection by surveying 10 students to comment on what each potential image represents.

Procedure Discussion:

Participants were placed in a scenario in which they could be granted legitimate access to a computer. This setup simulates a real-life scenario of an employee gaining access to a data repository. By asking the participants not to open the Personal folder, the investigators simulated a forbidden activity, even though they were able to perform this action. This serves as the abuse of privilege encountered in insider threats. By stating which files exist in the Personal folder, the investigators provided participants with details of what they could do and to what files. This also simulates a real insider threat scenario, as insiders are aware of the valuable information in an organization. Finally, the investigators informed participants that if they open one of the private files and get caught, the investigators will stop the experiment and they will fail to commit the maleficence without getting caught. The investigators simulate specific acts that an employee is informed not to perform while signing their employment contract and what consequences they may encounter if they are guilty of such a breach.

In order to know what file a participant has opened, if they opened any, the investigators used HyperCam™, which records the participant's actions while using the laptop. The main reason for asking participants not to report the file they plan to open or have opened is to address the psychological aspect of committing a wrongful act; they need to hide this action, which simulates a real-world scenario. The investigators used the monitor recorder to investigate whether an abuse of privileges occurred or not and to assess the IBAC model to determine if it would have been able to prevent the insider threat. The recordings provided the investigators information that the investigators can use to verify the accuracy of the IBAC model.

Test Environment:

The test environment for Experiment 2 is similar to that of Experiment 1; however, in this experiment, there are no target and non-target intents categories since the investigators do not know what the target intent is. Therefore, each intent category is analyzed separately by looking for a P300 peak to report on detected intention of access.

Figure 5:
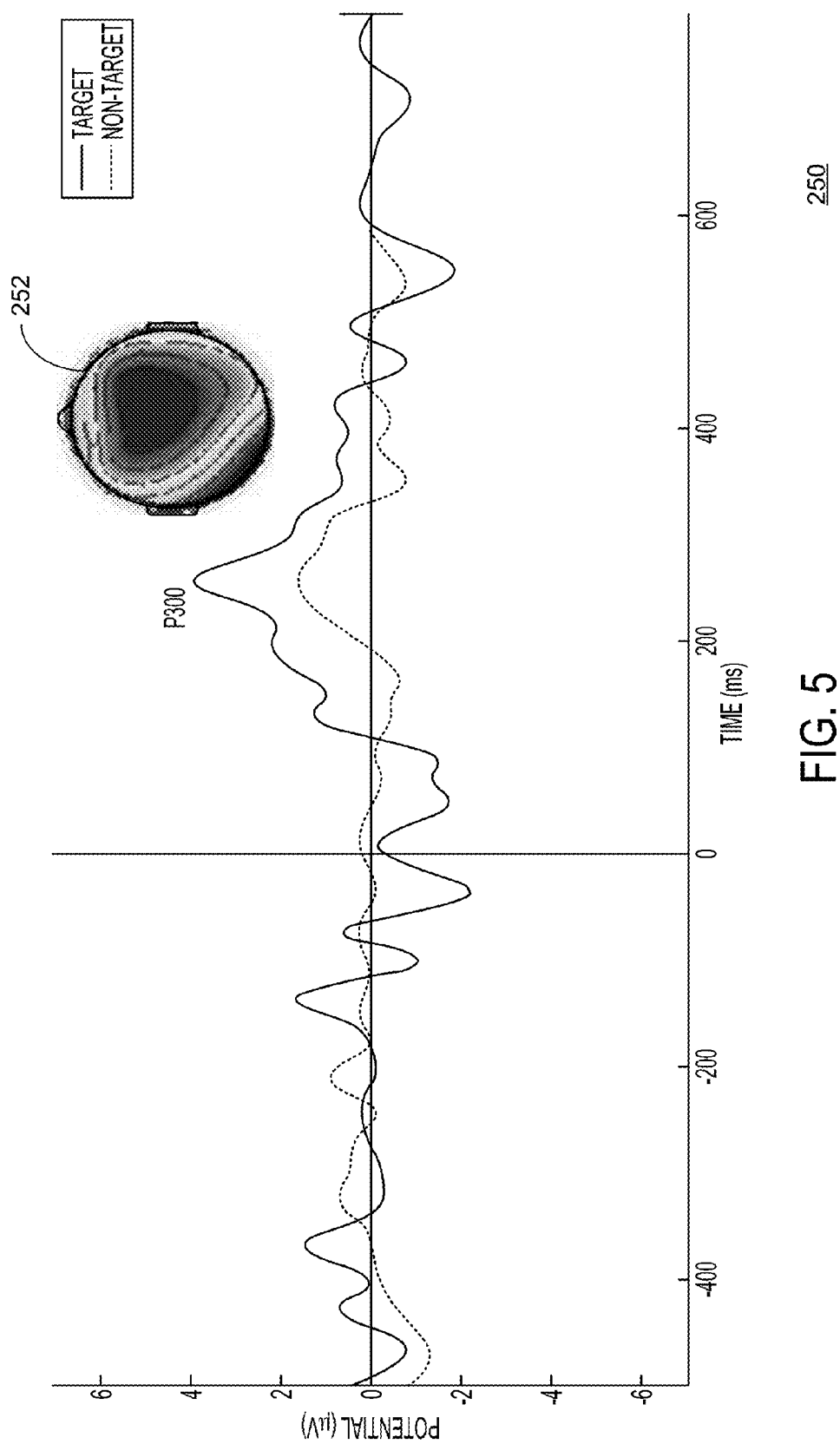
FIG. 5 and FIG. 6 illustrate P300 signals obtained during experimental testing, according to some embodiments.
Figure 6:
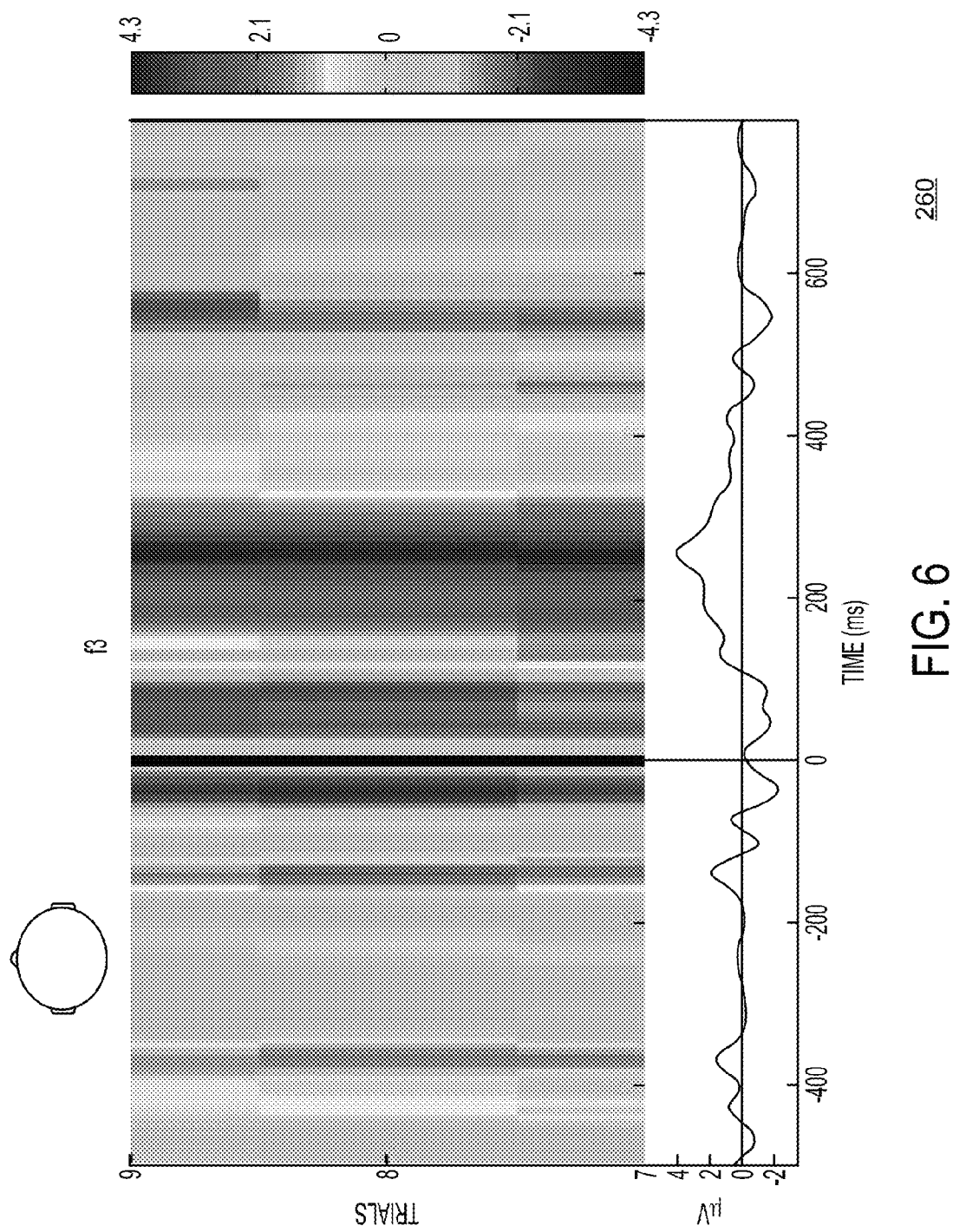

FIG. 5 depicts an example graph 250 illustrating reaction towards stimuli in both "target" and "non-target" categories including a heat map 252 depicting various physiological signals for a head of the user. FIG. 6 depicts an example graph 260 of the P300 waveform in target trials.

Further, a one tailed paired samples t test uncovers that the amplitude in the P300 waveform when viewing target stimuli (M=3.80, SD=1.61) compared to the highest amplitude of a 200 ms window of corresponding signal when viewing non-target stimuli (M=1.79, SD=0.41), t(29)=10.540, p≥0.005.

Experimental Results

The results also establish that P300 amplitude may be used to determine motivation towards an intention as viewing target stimuli results in higher amplitude than viewing non-target stimuli. By comparing the results in with a mean of $\mu=4.89$ with no motivation, $\mu=4.98$ and $\mu=6.1$ for two separate scenarios of motivation, the results showed a mean of $\mu=3.80$ of motivation for requesting access to a laboratory with an intention of burning it, which is less than the reported mean in all categories. This shows that the participants have recognized their intention, but were not motivated to execute it.

The values of ObjR were assigned for the experiments. The object risk level of burning a laboratory was assigned to be 50%. The object risk of private files was assigned to be 80%.

The values of IntC were assigned as follows. In the case of an intent to burn the laboratory, the intent category risk was assigned value of 90% due to the possibly catastrophic consequences. In the case of viewing private files, the intent category risk was assigned based on the type of file:
1) Private pictures is given the risk level of 35% given that the private pictures are not as sensitive and do not cause a high level of privacy impact.
2) Bank username and password is given the risk level of 90% given that the credentials of a bank account are highly sensitive.
3) Government secure file is given the risk level of 95% given that the information that is kept in the file is highly secure.
4) Diary is given the risk level of 65% giving that the information kept there is not sensitive but cause a high level of a privacy concern.

Table 1 summarizes each participant's data, including whether the intention was detected, the motivation level, the intent category risk, the object risk and the overall risk. Also, the access decision as per each participant's response is provided.

TABLE 1

30 participants' risk data and the access decision.

| Participant | Intention Detected | Intent Category Risk (IntC) | Motivation level (IntM) | Object Risk (ObjR) | Overall Risk ($R_{total}$) | Access Decision |
|---|---|---|---|---|---|---|
| 1 | Yes | 90% | 23% | 50% | 48.32% | Grant |
| 2 | Yes | 90% | 26% | 50% | 50.27% | Grant |
| 3 | Yes | 90% | 25% | 50% | 49.61% | Grant |
| 4 | Yes | 90% | 35% | 50% | 56.13% | Grant |
| 5 | Yes | 90% | 29% | 50% | 52.22% | Grant |
| 6 | Yes | 90% | 30% | 50% | 52.90% | Grant |
| 7 | Yes | 90% | 23% | 50% | 48.31% | Grant |
| 8 | Yes | 90% | 36% | 50% | 56.80% | Grant |
| 9 | Yes | 90% | 23% | 50% | 48.31% | Grant |
| 10 | Yes | 90% | 26% | 50% | 50.27% | Grant |
| 11 | Yes | 90% | 38.5% | 50% | 58.41% | Grant |
| 12 | Yes | 90% | 19% | 50% | 45.71% | Grant |
| 13 | Yes | 90% | 29% | 50% | 52.22% | Grant |
| 14 | Yes | 90% | 19% | 50% | 45.71% | Grant |
| 15 | Yes | 90% | 27.5% | 50% | 51.24% | Grant |
| 16 | Yes | 90% | 39.5% | 50% | 59.06% | Grant |
| 17 | Yes | 90% | 21% | 50% | 47.01% | Grant |
| 18 | Yes | 90% | 32% | 50% | 54.18% | Grant |
| 19 | Yes | 90% | 43% | 50% | 61.34% | Grant |
| 20 | Yes | 90% | 50% | 50% | 65.90% | Grant |
| 21 | Yes | 95% | 62% | 80% | 78.50% | Deny |
| 22 | Yes | 35% | 65% | 80% | 72.32% | Deny |
| 23 | Yes | 65% | 50% | 80% | 69.62% | Deny |
| 24 | Yes | 65% | 55% | 80% | 72.14% | Deny |
| 25 | Yes | 90% | 45% | 80% | 68.87% | Deny |
| 26 | Yes | 35% | 63% | 80% | 71.50% | Deny |
| 27 | Yes | 65% | 66% | 80% | 77.68% | Deny |
| 28 | Yes | 95% | 59% | 80% | 76.86% | Deny |
| 29 | Yes | 35% | 57% | 80% | 68.90% | Deny |
| 30 | Yes | 65% | 60% | 80% | 74.66% | Deny |

Figure 7:
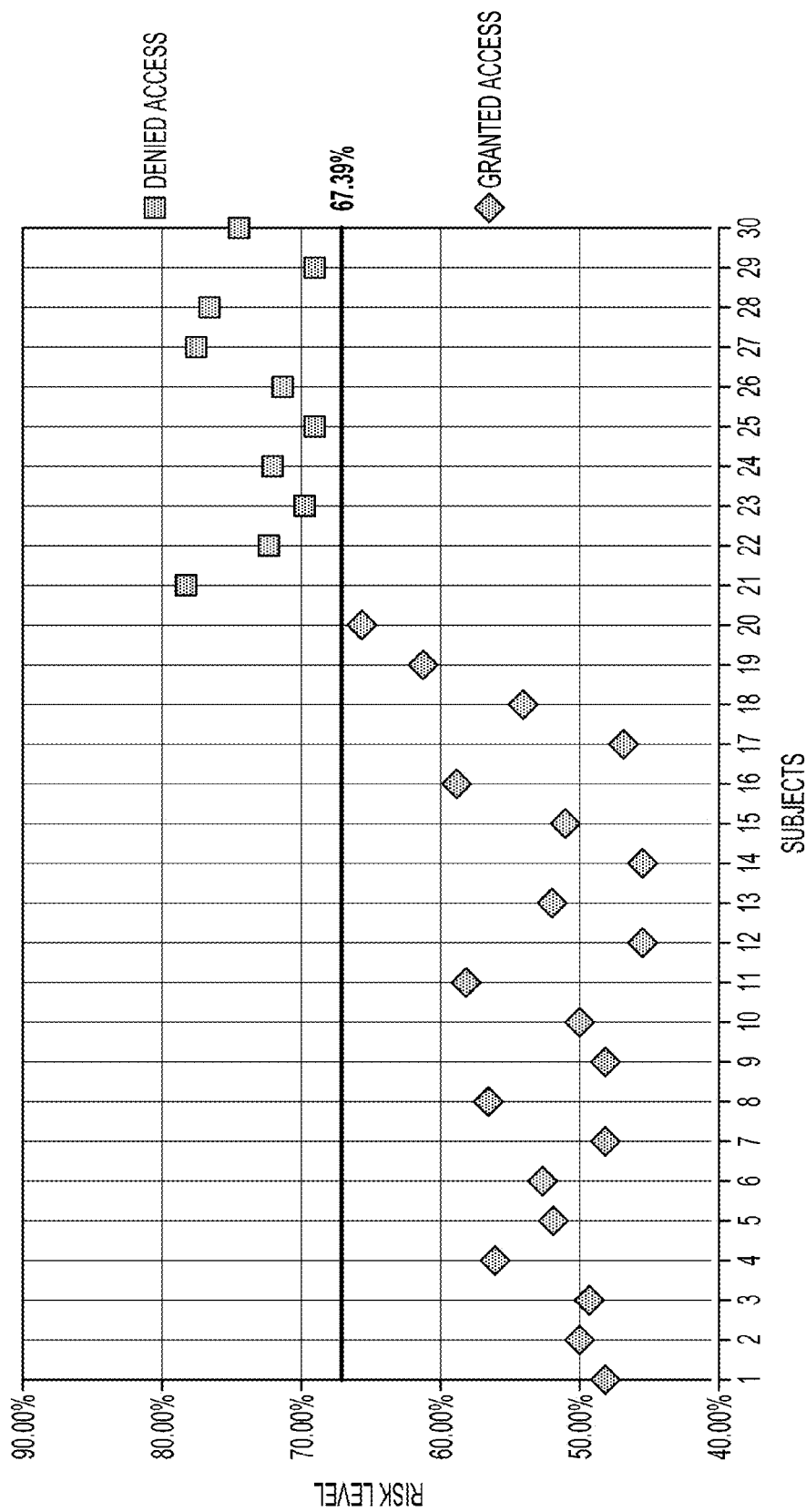
FIG. 7 depicts an example risk threshold for granting/denying access, according to some embodiments.
Figure 8:
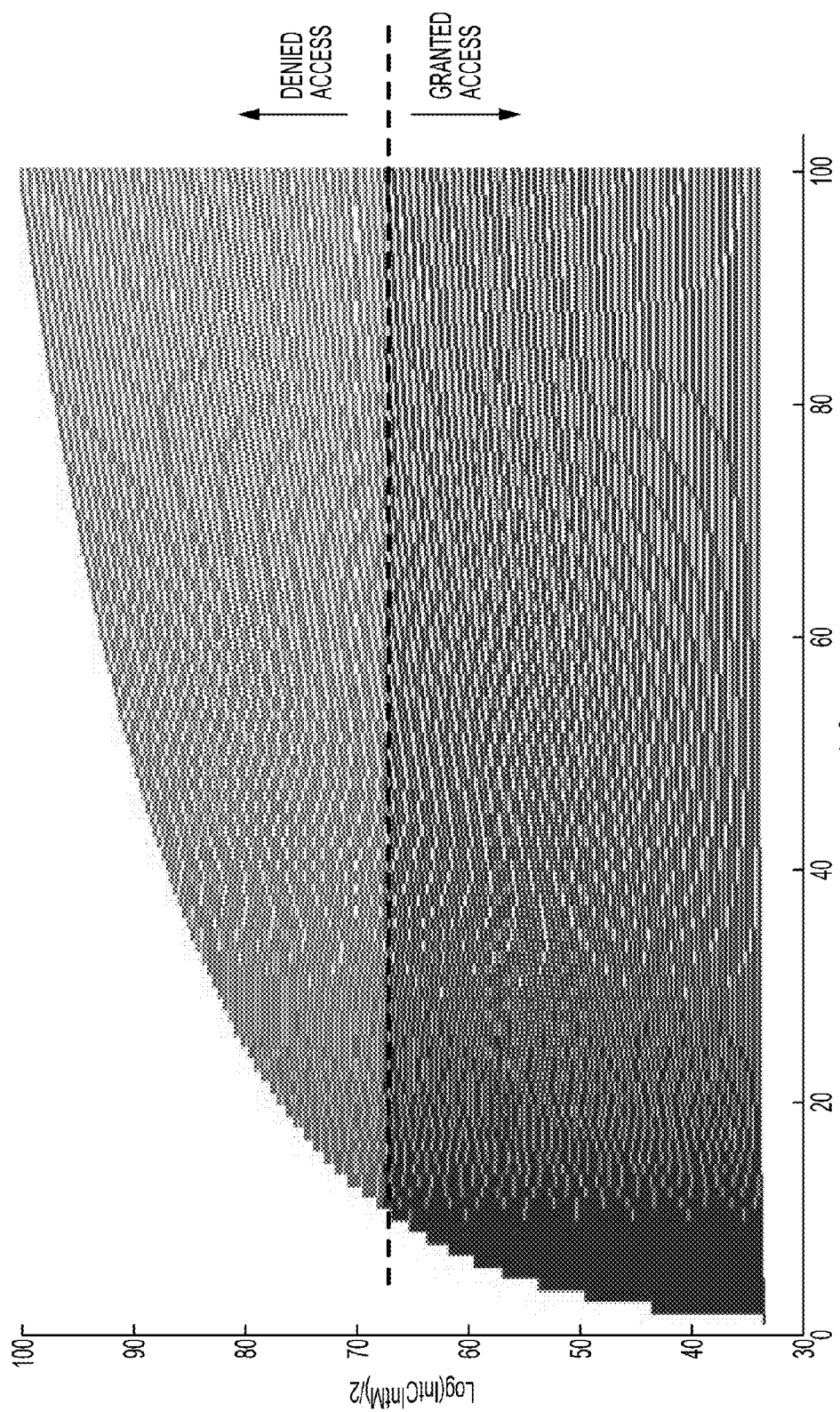
FIGS. 8, 9, and 10 show example risk distributions, according to some embodiments.
Figure 9:
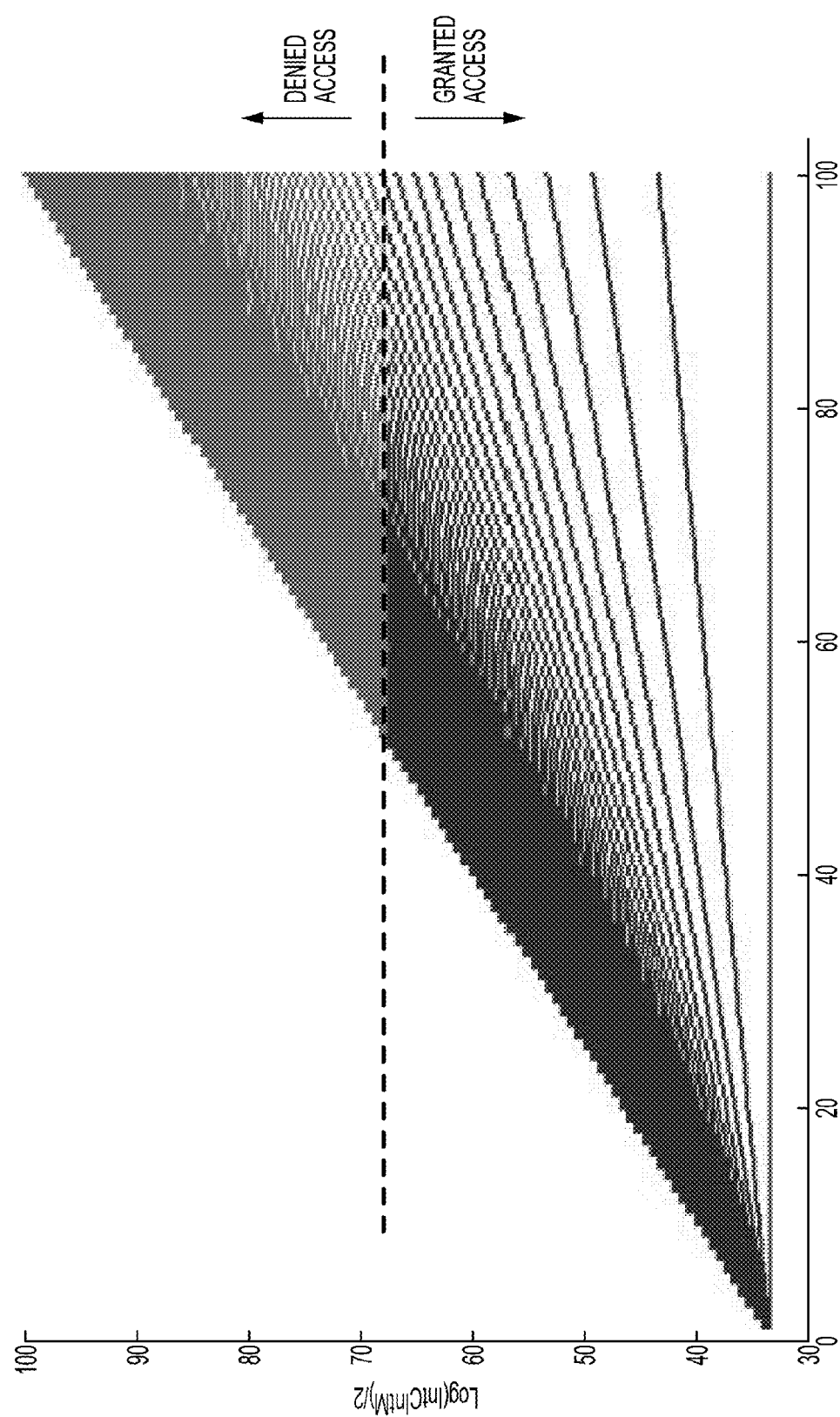
Figure 10:
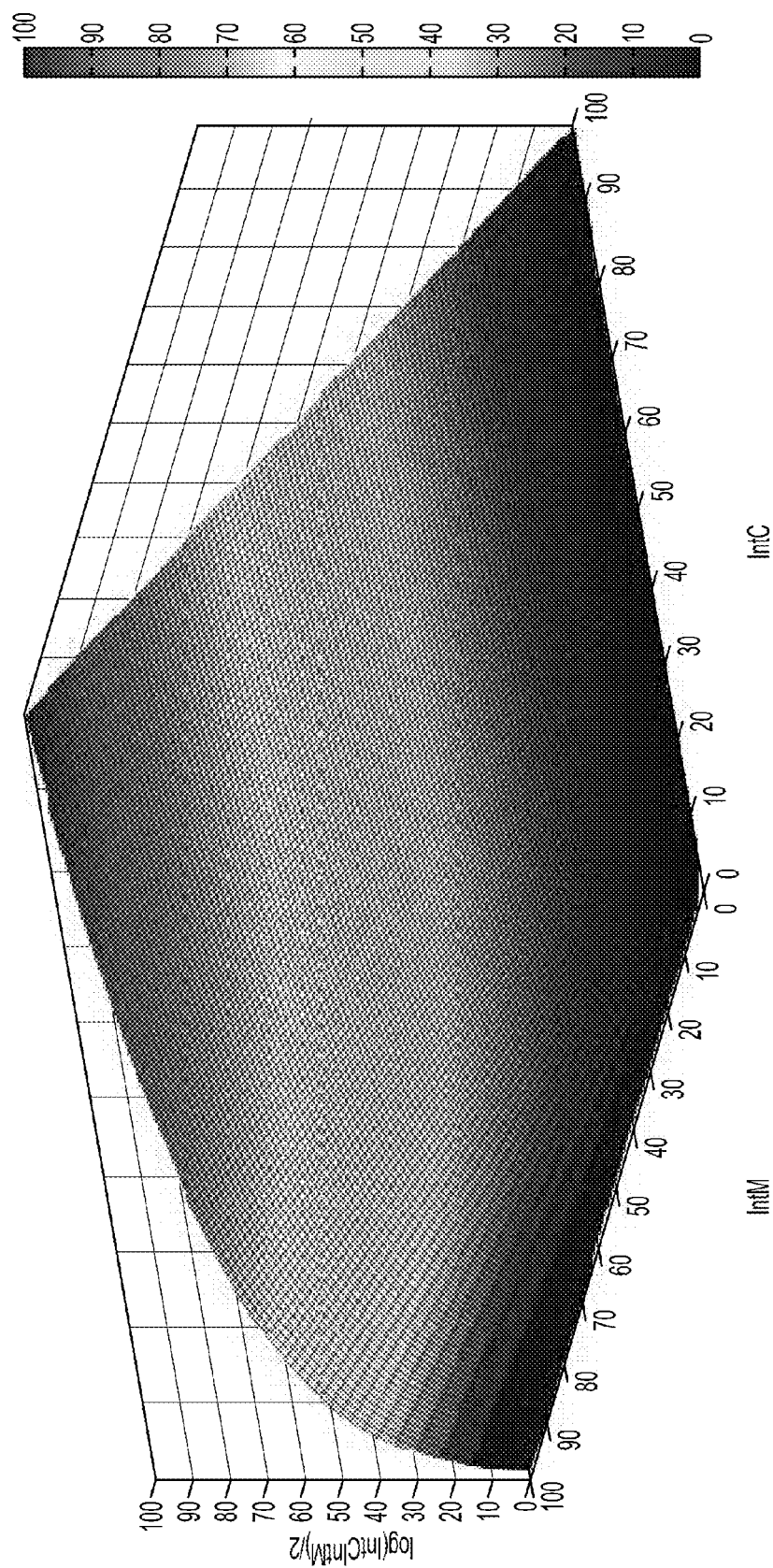

FIG. 7 depicts an example graph 270 with a line that separates granting access versus denying access based on an overall risk ($R_{total}$) threshold of 67.40%. FIGS. 8 and 9, respectively show example graphs 280, 290 of the logarithmic distribution of the intent risk based on IntC and IntM, for an overall risk threshold of 67.40%. FIG. 10 shows a 3-dimensional logarithmic graph 300 for intent category risk, intent motivation risk and the calculated risk (Eq. (2)).

The results support granting the first 20 participants access and denying the remaining 10 participants access, based on any risk level that is above 67.40%. For these experiments, the False acceptance rate (FAR) and False rejection rate (FRR) are both equal to 0.

Analysis of Experimental Results

Statistics suggest that the target vs. non-target intent categories are different from one another. Three different feature sets were utilized in testing the experimental results.

Feature Set 1

A two-tailed t test uncovers that for the intent category in the ERP waveform when viewing intention category-related stimuli, compared with non-intent category-related stimuli (p≥0.005 as seen in Table 2). Table 2 all features except for O2 show a statistically significant difference between the two classes. Only those features were used to train a classifier to differentiate between the classes of intention.

TABLE 2 t-test for EEG signals in Set 1 of features.
Two-Tailed Paired Samples T-Test

| Feature | Target Stimuli | | Non-Target Stimuli | | P value |
|---|---|---|---|---|---|
| | Mean | STD | Mean | STD | |
| AF3 | 0.650621 | 4.011416 | −0.54195 | 2.77626 | 1.22E−27 |
| F7 | 0.441488 | 4.056893 | −0.18965 | 2.557644 | 5.31E−12 |
| F3 | −0.36546 | 3.383893 | 0.352824 | 1.717832 | 2.01E−17 |
| FC5 | 0.240313 | 2.967626 | −0.08775 | 1.630703 | 2.04E−06 |
| T7 | 0.627111 | 3.7039 | −0.08366 | 1.8681 | 5.31E−14 |
| P7 | −0.28513 | 3.447893 | −0.0001 | 1.809565 | 0.000713 |
| O1 | −0.43862 | 3.87856 | −0.13918 | 1.892136 | 0.000902 |
| O2 | −0.14167 | 4.387815 | −0.07455 | 2.224363 | 0.482974 |
| P8 | −0.05207 | 3.386018 | 0.273787 | 1.821748 | 7.61E−05 |
| T8 | −0.67635 | 3.628576 | 0.36694 | 1.994857 | 2.83E−26 |
| FC6 | −0.36209 | 2.849143 | 0.044582 | 1.552893 | 6.91E−08 |
| F4 | −0.04388 | 3.514306 | 0.305885 | 1.677481 | 6.91E−05 |
| F8 | −0.26114 | 4.406859 | 0.082364 | 2.641675 | 0.001506 |
| AF4 | 0.666862 | 4.054723 | −0.30954 | 2.387751 | 8.88E−19 |

By comparing the signal deviation between the classes of intention, the investigators notice that target stimuli show higher deviation values compared with non-target stimuli, which indicates a signal change in the target signals compared with non-target signals.

Feature Set 2

Statistics also suggest that target vs. non-target intent categories are different from one another. A two-tailed t test uncovers that for the intent category in the ERP waveform when viewing intention category-related stimuli, compared with non-intent category-related stimuli ($p \leq 0.05$ as seen in Table 3). Table 3 shows all features except for F8 and O2 show statistically significant differences between the two classes. Only those features were used to train a classifier to differentiate between the classes of intention.

TABLE 3 t-test for EEG signals in Set 2 of features.
Two-Tailed Paired Samples T-Test

| Feature | Target Stimuli | | Non-Target Stimuli | | P value |
|---|---|---|---|---|---|
| | Mean | STD | Mean | STD | |
| AF3 | 0.809129 | 4.225099 | −0.65557 | 2.98933 | 1.08E−15 |
| F7 | 0.634337 | 4.600938 | −0.37916 | 2.921047 | 1.93E−10 |
| F3 | −0.81813 | 3.660913 | 0.493168 | 1.765868 | 2.87E−22 |
| FC5 | 0.497342 | 3.297253 | −0.14117 | 1.817545 | 8.16E−08 |
| T7 | 0.679297 | 3.744582 | −0.13189 | 2.115932 | 6.63E−08 |
| P7 | −0.11869 | 3.868955 | 0.208766 | 1.803941 | 0.022447 |
| O1 | −0.42424 | 4.415021 | −0.0681 | 1.824912 | 0.027345 |
| O2 | −0.11622 | 4.764677 | 0.060299 | 2.470093 | 0.263054 |
| P8 | 0.083159 | 3.570381 | 0.381089 | 1.971294 | 0.028904 |
| T8 | −0.77012 | 3.85311 | 0.331569 | 2.151914 | 4.7E−12 |
| FC6 | −0.45018 | 3.217628 | 0.009929 | 1.637126 | 0.000344 |
| F4 | −0.34309 | 3.615241 | 0.375378 | 1.766959 | 1.08E−07 |
| F8 | −0.14443 | 4.378101 | −0.03492 | 2.810058 | 0.53072 |
| AF4 | 0.48182 | 4.315791 | −0.44939 | 2.664195 | 9.63E−07 |

By comparing the signal deviation between the classes of intention, the investigators notice that target stimuli show higher deviation compared with non-target stimuli, which indicates a signal change in the target signals compared with non-target signals.

Feature Set 3

In Feature Set 3, statistics suggest that target vs. non-target intent categories are different from one another. A two-tailed t-test shows that the intent category in the ERP waveform when viewing intention category-related stimuli, compared with non-intent category-related stimuli ($p \leq 0.05$ as seen in Table 7). Table 4 all features except for AF3MIN and all 14 average features (AF3-AF4) show statistically significant differences between the two classes. Only those features were used to train a classifier to differentiate between the classes of intention.

TABLE 4 t-test for EEG signals in Set 3 of features.
Two-Tailed Paired Samples T-Test

| Feature | Target Stimuli | | Non-Target Stimuli | | P value |
|---|---|---|---|---|---|
| | Mean | STD | Mean | STD | |
| AF3MAX | 7.204952 | 3.332408 | 3.191294 | 1.390299 | 0.000104 |
| F7MAX | 6.717554 | 2.993456 | 3.703405 | 1.431664 | 0.000122 |
| F3MAX | 5.602177 | 2.830957 | 3.14735 | 1.321553 | 0.000426 |
| FC5MAX | 5.35621 | 2.493862 | 2.717832 | 1.127218 | 0.000143 |
| T7MAX | 6.848787 | 5.202875 | 3.385123 | 1.544569 | 0.00696 |
| P7MAX | 5.527473 | 2.70705 | 3.313926 | 1.611992 | 0.00086 |
| O1MAX | 5.824973 | 3.315588 | 3.378415 | 1.860487 | 0.002667 |
| O2MAX | 6.940293 | 4.782075 | 4.045051 | 2.85715 | 0.002701 |
| P8MAX | 6.254222 | 4.402191 | 3.63111 | 2.21232 | 0.009388 |
| T8MAX | 5.850436 | 3.619003 | 3.334464 | 2.361067 | 0.002201 |
| FC6MAX | 4.396876 | 1.810235 | 2.755692 | 1.683214 | 0.000518 |
| F4MAX | 5.237806 | 2.846231 | 3.07138 | 1.243162 | 0.001304 |
| F8MAX | 7.014712 | 4.029736 | 4.027938 | 2.424824 | 0.001818 |
| AF4MAX | 7.612029 | 3.856165 | 3.40502 | 1.349341 | 3.14E−05 |
| AF3MIN | −5.92409 | 4.056169 | −4.53445 | 3.370271 | 0.156632 |
| F7MIN | −5.88704 | 4.946679 | −4.16181 | 2.933606 | 0.033563 |
| F3MIN | −6.28978 | 3.659636 | −2.53406 | 1.775893 | 5.14E−05 |
| FC5MIN | −4.81894 | 2.748679 | −2.73519 | 1.651796 | 0.000983 |
| T7MIN | −5.70042 | 3.124697 | −3.20146 | 1.465879 | 0.000701 |
| P7MIN | −6.74761 | 4.04669 | −3.1683 | 1.652223 | 0.000961 |
| O1MIN | −6.36455 | 3.329766 | −3.46788 | 1.665775 | 0.000961 |
| O2MIN | −7.56682 | 3.953287 | −4.04485 | 1.813246 | 0.000168 |
| P8MIN | −6.13032 | 3.116662 | −2.90281 | 1.1583 | 2.36E−05 |
| T8MIN | −6.91942 | 3.99346 | −2.68892 | 0.962131 | 0.000148 |
| FC6MIN | −4.74477 | 2.288567 | −2.65374 | 1.232314 | 0.00222 |
| F4MIN | −4.86179 | 3.32642 | −2.81741 | 1.5478 | 0.016864 |
| F8MIN | −7.03241 | 3.661152 | −4.04273 | 1.854974 | 0.002391 |
| AF4MIN | −5.99105 | 2.783016 | −3.77883 | 2.657455 | 0.021188 |
| AF3AVG | 0.650621 | 2.444151 | −0.54195 | 2.12561 | 0.109997 |
| F7AVG | 0.441488 | 2.822144 | −0.18965 | 1.709641 | 0.221839 |
| F3AVG | −0.36546 | 1.955512 | 0.352824 | 1.207744 | 0.155965 |
| FC5AVG | 0.240313 | 1.800697 | −0.08775 | 1.056046 | 0.362446 |
| T7AVG | 0.627111 | 2.047213 | −0.08366 | 1.206227 | 0.206141 |
| P7AVG | −0.28513 | 1.730622 | −0.0001 | 0.914198 | 0.501478 |
| O1AVG | −0.43862 | 2.538061 | −0.13918 | 0.969892 | 0.596354 |
| O2AVG | −0.14167 | 2.618376 | −0.07455 | 1.310781 | 0.88787 |
| P8AVG | −0.05207 | 1.621392 | 0.273787 | 0.958653 | 0.459105 |
| T8AVG | −0.67635 | 2.019386 | 0.36694 | 1.436537 | 0.095794 |
| FC6AVG | −0.36209 | 1.689758 | 0.044582 | 0.984267 | 0.404772 |
| F4AVG | −0.04388 | 2.419404 | 0.305885 | 0.96275 | 0.557901 |
| F8AVG | −0.26114 | 2.688784 | 0.082364 | 1.898797 | 0.62703 |
| AF4AVG | 0.666862 | 2.357569 | −0.30954 | 1.656919 | 0.199216 |
| AF3STD | 3.032445 | 1.098735 | 1.793978 | 0.820777 | 7.57E−06 |
| F7STD | 2.803178 | 1.161726 | 1.881994 | 0.648193 | 9.89E−05 |
| F3STD | 2.598834 | 1.108449 | 1.257343 | 0.387591 | 2.41E−06 |
| FC5STD | 2.290648 | 0.76015 | 1.25464 | 0.384105 | 9.23E−07 |
| T7STD | 2.809989 | 1.374931 | 1.452755 | 0.423357 | 4E−05 |
| P7STD | 2.784989 | 1.129555 | 1.520645 | 0.50966 | 5.28E−06 |
| O1STD | 2.818411 | 1.013027 | 1.574411 | 0.540184 | 1.68E−07 |
| O2STD | 3.320515 | 1.444362 | 1.745371 | 0.667559 | 1.95E−06 |
| P8STD | 2.74925 | 1.277466 | 1.488097 | 0.624121 | 1.14E−05 |
| T8STD | 2.763837 | 1.405659 | 1.403008 | 0.547977 | 3.83E−05 |
| FC6STD | 2.123252 | 0.79723 | 1.194104 | 0.374917 | 9.5E−06 |
| F4STD | 2.415941 | 1.042766 | 1.33287 | 0.462729 | 1.62E−06 |
| F8STD | 3.238225 | 1.132111 | 1.876292 | 0.65992 | 7.25E−06 |
| AF4STD | 3.093815 | 1.195197 | 1.689021 | 0.679884 | 6.34E−07 |

By comparing the signal deviation between the classes of intention, the investigators notice that target stimuli show higher deviations compared with non-target stimuli, which indicates a signal change in the target signals compared with non-target signals.

As the statistics suggest a difference between target vs. non-target stimuli in all three sets of features, the investigators investigated and reported the ability to detect the category of an intention of access and the intention detection accuracy using WEKA (Waikato Environment for Knowledge Analysis).

WEKA Analysis Results

For Feature Set 1 of the Electrodes Only:

After generating the model with a 10-fold cross-validation test metric for each algorithm, the investigators uncovered the accuracy results in Table 5:

TABLE 5

Feature Set 1 Results.

| Classifier | Features | Number of Features | Accuracy Rate |
|---|---|---|---|
| Nearest-Neighbor Classifier | F7, FC5, T7, P7, O1, P8, T8, FC6, F4 and F8 | 10 features | 96.55% |
| SVM | F7, FC5, T7, P7, O1, P8, T8, FC6, F4 and F8 | 10 features | 95.68% |
| Random Forest | F7, FC5, T7, O1, P8, T8, FC6, F4 and F8 | 9 features | 91.16% |
| Neural Networks | F7, FC5, T7, P7, O1, P8, T8, FC6, F4 and F8 | 10 features | 85.97% |
| Naïve Bayes | F7, FC5, T7, P7, O1, T8, FC6 and F8 | 8 features | 75.62% |

The best classifiers for the P300-based intention detection in Set 1 for this example are Nearest Neighbor and Support Victor Machine with 96.55% and 95.68% accuracy, respectively. Then, the classifiers Random Forest, Neural Networks, and Naïve Bayes had reported accuracy values of 91.16%, 85.97%, and 75.62%, respectively.

The Nearest Neighbor classifier reported FNMR, which maps to an insider with malicious intention not being detected by the system, of 0.91% as the lowest measured rate. Other classifiers reported the rates of 1.27% 4.54%, 8.43%, and 13.33% for SVM, Random Forest, Neural Networks, and Naïve Bayes classifiers, respectively. The Nearest Neighbor classifier reported 5.97% FMR, which metric describes an insider with good intent being reported to have a malicious intention, as the best FMR among all classifiers. SVM, Random Forest, Neural Networks, and Naïve Bayes reported 7.35%, 13.13%, 19.62%, and 35.41% FMR values, respectively.

The best set of features is F7, FC5, T7, P7, O1, P8, T8, FC6, F4, and F8, using the Nearest Neighbor classifier, with an accuracy rate of 96.55%.

For Feature Set 2 (Identical to Feature Set 1 but for 200 ms-500 ms)

After generating the model with a 10-fold cross-validation test metric for each algorithm, the investigators discovered the accuracy results in Table 6:

TABLE 6

Feature Set 2 Results.

| Classifier | Features | Number of Features | Accuracy Rate |
|---|---|---|---|
| Nearest-Neighbor Classifier | F7, F3, FC5, T7, O1, T8 and F4 | 7 features | 99.35% |
| SVM | F7, F3, FC5, T7, P7, O1, P8, T8, FC6, and F4 | 10 features | 99.59% |

TABLE 6-continued

Feature Set 2 Results.

| Classifier | Features | Number of Features | Accuracy Rate |
|---|---|---|---|
| Random Forest | F7, F3, T7, O1, T8, and FC6 | 6 features | 96.25% |
| Neural Networks | F7, F3, FC5, T7, P7, O1, P8, T8, FC6, and F4 | 10 features | 95.08% |
| Naïve Bayes | F3, T7, O1 and T8 | 4 features | 80.06% |

The best classifiers for the P300-based intention detection in Set 2 are SVM and Nearest Neighbor, with 99.59% and 99.35% accuracy, respectively. Then, the classifiers Random Forest, Neural Networks, and Naïve Bayes reported accuracy values of 96.25%, 95.08%, and 80.06%, respectively.

The SVM classifier reported FNMR, which maps to an insider with malicious intention, not being detected by the system, with its value of 0.58% representing the best rate among all classifiers. Other classifiers reported the rates of 1.05%, 4.56%, 5.61%, and 27.13% for Nearest Neighbor, Random Forest, Neural Networks, and Naïve Bayes classifiers, respectively. The SVM and Nearest Neighbor classifiers reported 0.23% FMR, which describes an insider with good intentions being reported to have malicious intentions, as the best FMR value among all classifiers. Random Forest, Neural Networks, and Naïve Bayes classifiers reported 2.92% 4.21%, and 12.74% FMR values, respectively.

The best set of features is FC5MAX, T8MIN, FC6MIN, F4MIN, F8MIN, FC5STD and FC6STD combined with the classifier SVM, with an accuracy rate of 100%.

For Feature Set 3 (MAX-MIN-AVG-STD for Each Electrode):

After generating the model with a 10-fold cross-validation test metric for each algorithm, the investigators determined the accuracy results in Table 7.

TABLE 7

Feature Set 3 Results.

| Classifier | Features | Number of Features | Accuracy Rate |
|---|---|---|---|
| Nearest-Neighbor Classifier | FC5MAX, T7MAX, P7MAX, F7MAX, T7STD, O1STD and T8STD | 4 MAX type and 3 STD type for total 7 features | 100% |
| SVM | FC5MAX, T8MIN, FC6MIN, F4MIN, F8MIN, FC5STD and FC6STD | 1 MAX type, 4 MIN type and 2 STD type for total 7 features | 100% |
| Random Forest | F4MAX, F8MAX, P8MIN, F7STD, F3STD and T7STD | 2 MAX type, 1 MIN type and 3 STD type for total 6 features | 100% |
| Neural Networks | T8MIN, FC5STD and F4STD | 1 MIN type and 2 STD type for 3 features | 98.68% |
| Naïve Bayes | T8MIN, FC5STD and FC6STD | One feature from the 1 MIN type and 2 STD for total 3 features | 97.80% |

The best classifiers for the P300-based intention detection in Set 3 are Nearest Neighbor, SVM, and Random Forest, each with 100% accuracy. Then, the classifiers Neural Networks and Naïve Bayes had reported accuracy values of 98.68% and 97.80%, respectively.

Nearest Neighbor, SVM, and Random Forest classifiers reported FNMR values, which map to an insider with malicious intention not being detected by the system, of 0%. The Neural Networks and Naïve Bayes classifiers had reported FNMR rates of 2.63% and 3.50%, respectively. Nearly all classifiers reported 0% FMR, representing an insider with good intentions being reported to have malicious intentions, except for Naïve Bayes, which had a reported FMR value of 0.87%.

The best set of features is F4MAX, F8MAX, P8MIN, F7STD, F3STD and T7STD with the classifier Random Forest, with an accuracy rate of 100% and only 6 features.

Table 8 summarizes Feature Sets 1, 2 and 3 and the classifiers' results of accuracy, sensitivity, specificity, False Match Rates, and False Non-Match Rates. Promising algorithms in terms of accuracy are bolded.

TABLE 8

Accuracy of detecting intentions of access using different classifiers.
Accuracy of P300 as an Intention Measure Using Different Classifiers

| Results | | Classifier | | | | |
|---|---|---|---|---|---|---|
| | | Nearest Neighbor | Support Vector Machine | Random Forest | Neural Networks | Naïve Bayes |
| Feature Set 1 (Electrodes Only) | Accuracy | 96.55% | 95.68% | 91.16% | 85.97% | 75.62% |
| | Sensitivity | 98.70% | 98.63% | 95.02% | 90.50% | 82.89% |
| | Specificity | 93.20% | 93.06% | 87.90% | 82.35% | 79.99% |
| | FMR | 0.91% | 1.27% | 4.54% | 8.43% | 13.33% |
| | FNMR | 5.97% | 7.35% | 13.13% | 19.62% | 35.41% |
| Feature Set 2 (Set 1, but with 200 ms-500 ms) | Accuracy | 99.35% | 99.59% | 96.25% | 95.08% | 80.06% |
| | Sensitivity | 99.76% | 99.76% | 97.02% | 95.72% | 85.11% |
| | Specificity | 98.95% | 99.41% | 95.51% | 94.46% | 76.27% |
| | FMR | 0.23% | 0.23% | 2.92% | 4.21% | 12.74% |
| | FNMR | 1.05% | 0.58% | 4.56% | 5.61% | 27.13% |
| Feature Set 3 (Electrodes MAX, MIN, AVG and STD) | Accuracy | 100% | 100% | 100% | 98.68% | 97.80% |
| | Sensitivity | 100% | 100% | 100% | 100% | 99.10% |
| | Specificity | 100% | 100% | 100% | 97.43% | 96.58% |
| | FMR | 0 | 0 | 0 | 0 | 0.87% |
| | FNMR | 0 | 0 | 0 | 2.63% | 3.50% |

Experimental Conclusions

First, using the 30 participants' brain reactions to visual stimuli in both experiments, the investigators demonstrated that P300 is a valid measure for intention detection by stimulating the brain by asking about the intention of an action and showing possible intentions. An intention recognition identified by eliciting a P300 peak is evidence of the existence of the intention information residing in the brain, given that everyone knows their intention of an action. In both experiments, having in mind the intention of burning a lab and opening a personal file maliciously, the 30 participants showed P300 peaks only in the "Burning Lab" category in the case of Experiment 1 and in the specific personal file target stimuli in Experiment 2. These results suggest that P300 is a valid approach for identifying what a person is intending by showing him or her an image of the intended thought. The experimental results support the validity of the hypothesis stating the possibility of intention detection by the analysis of the EEG signals of individuals related to the recognition of their intentions using P300 data. The statistics suggest a differentiation of the EEG signals when viewing an intent category that relates to an intention and the intent category that does not relate to an intention. The classification accuracy of 100% using SVM, Nearest Neighbor, and Random Forest classifiers supports the tested hypothesis.

A one-tailed t-test reveals the amplitude of the P300 waveform when viewing target stimuli in both experiments (M=3.00, SD=1.61) compared with the highest amplitude of a 200 ms window of corresponding signal when viewing non-target stimuli in both experiments (M=1.79, SD=0.41), p≥0.0005. This indicates a differentiation between the signal amplitude in the target vs. non-target cases, showing higher amplitude in the target stimuli compared with non-target stimuli.

Further, a two-tailed t-test shows the amplitude in the P300 waveform when viewing target stimuli in Experiment 1 (M=2.97, SD=0.08) compared with the amplitude when viewing target stimuli in Experiment 2 (M=5.82, SD=0.06), p≥0.0005. This indicates a differentiation between the signal amplitude in the P300 amplitude in Experiment 1 when viewing target stimuli compared with the P300 amplitude in Experiment 2 when viewing target stimuli. It also indicates that the P300 amplitude is higher in Experiment 2 when viewing target stimuli than the P300 amplitude in Experiment 1 when viewing target stimuli. Given that none of the participants executed their intention in Experiment 1, but all participants executed their intentions in Experiment 2, this indicates that the signal amplitude corresponds to the likelihood of an intent execution.

Moreover, by comparing the results in Kelih et al. with a mean of μ=4.89 with no motivation, μ=4.98 and μ=6.1 for two separate scenarios of motivation, the investigators find that Experiment 1 shows a mean average of μ=2.97 of motivation for requesting access to a lab with an intention of burning it. This indicates that participants of Experiment 1 had low motivation to execute their intentions. Also, by comparing the results in Kelih et al. with Experiment 2, which had an average of μ=5.82, which resides between the two categories of tested motivation in Kelih et al., the investigators concluded that the participants in Experiment 2 were motivated to execute their intentions.

These findings result in the conclusion that the participants in Experiment 1 recognized their intentions, but were not motivated to execute them, while participants in Experiment 2 recognized their intentions and were motivated to execute them. The investigators concluded that the P300 amplitude can effectively describe how an intention is most likely to happen, which is based on the motivation level that corresponds to a specific intention.

IBAC is capable of detecting the category of an intention, and the probability that that intention is to be executed with varying degrees of risk.

The varying degrees of probability of an intention to be executed and the ability to detect an intention provide the risk if access is to be granted. Current access control systems fail to do so, and grant access based on irrelevant measures such as identity. The impact of using images as stimuli shows that at a risk level of 40 as a threshold, the system results in 0% falsely accepted, 95% correctly accepted, 5% falsely rejected and 100% correctly rejected users.

If the risk level is to be set at 46 as a threshold, the system results in 20% falsely accepted, 100% correctly accepted, 0% falsely rejected and 80% correctly rejected users, which means that the new technology does not result in a negative impact in rejecting a legitimate user compared with the risk threshold of 40, but with 80% of insiders being correctly rejected.

When using text as a stimulus, the following results were noted: with a risk level of 35 as a threshold, the system results in 0% falsely accepted, 100% correctly accepted, 0% falsely rejected and 100% correctly rejected users, which means that the new technology does not result in a negative impact with 100% of insiders being correctly rejected.

Figure 11A:
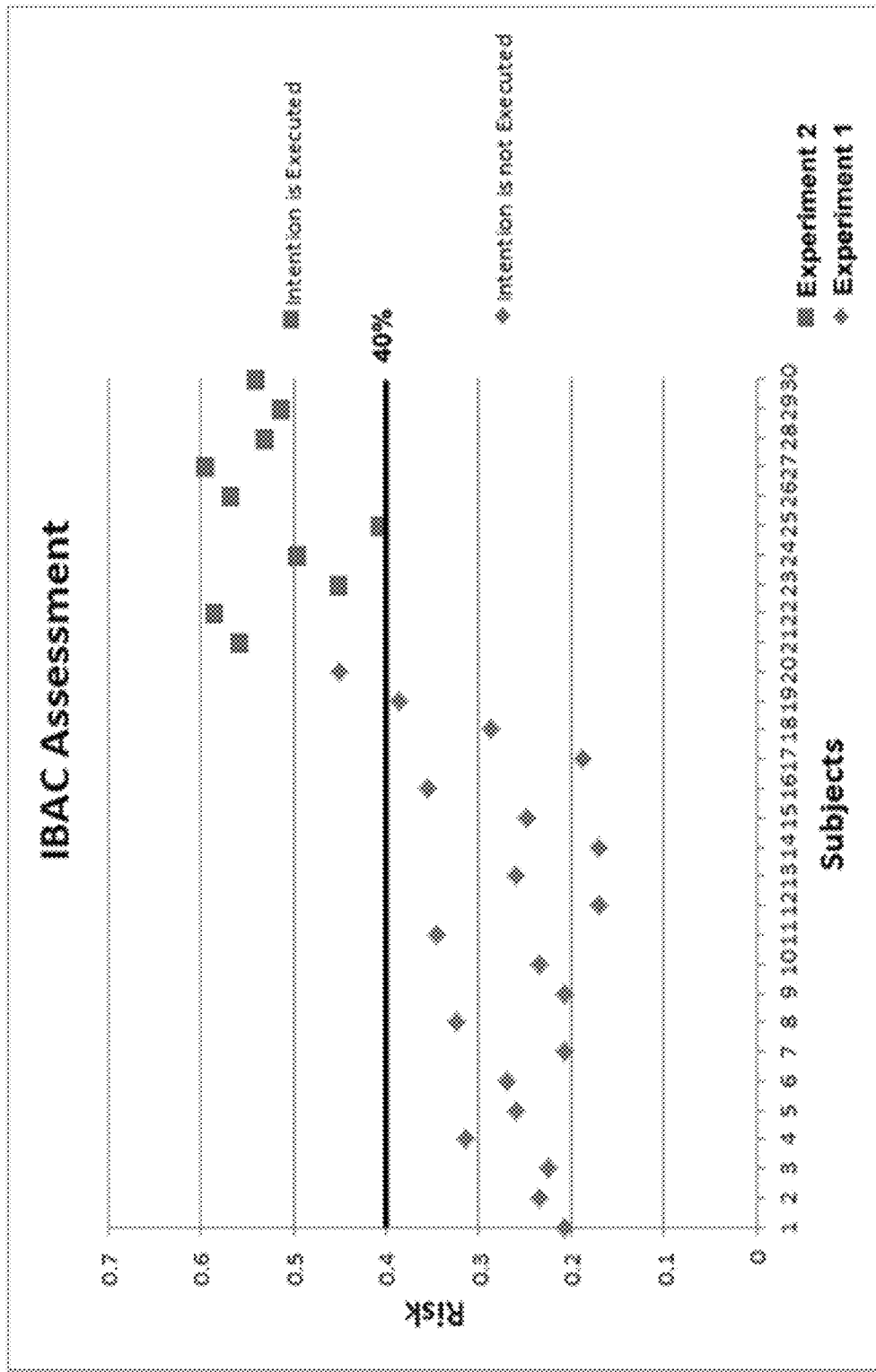
FIG. 11A is a graph illustrating the risk level corresponding to the executed vs. non-executed malicious intentions groups in experiments 1 and 2, where the threshold is set at 40% (image based experiment), according to some embodiments.

FIG. 11A is an example graph 310 illustrating the risk level corresponding to the executed vs. non-executed malicious intentions groups in experiments 1 and 2, where the threshold is set at 40% (image based experiment), according to some embodiments.

Figure 11B:
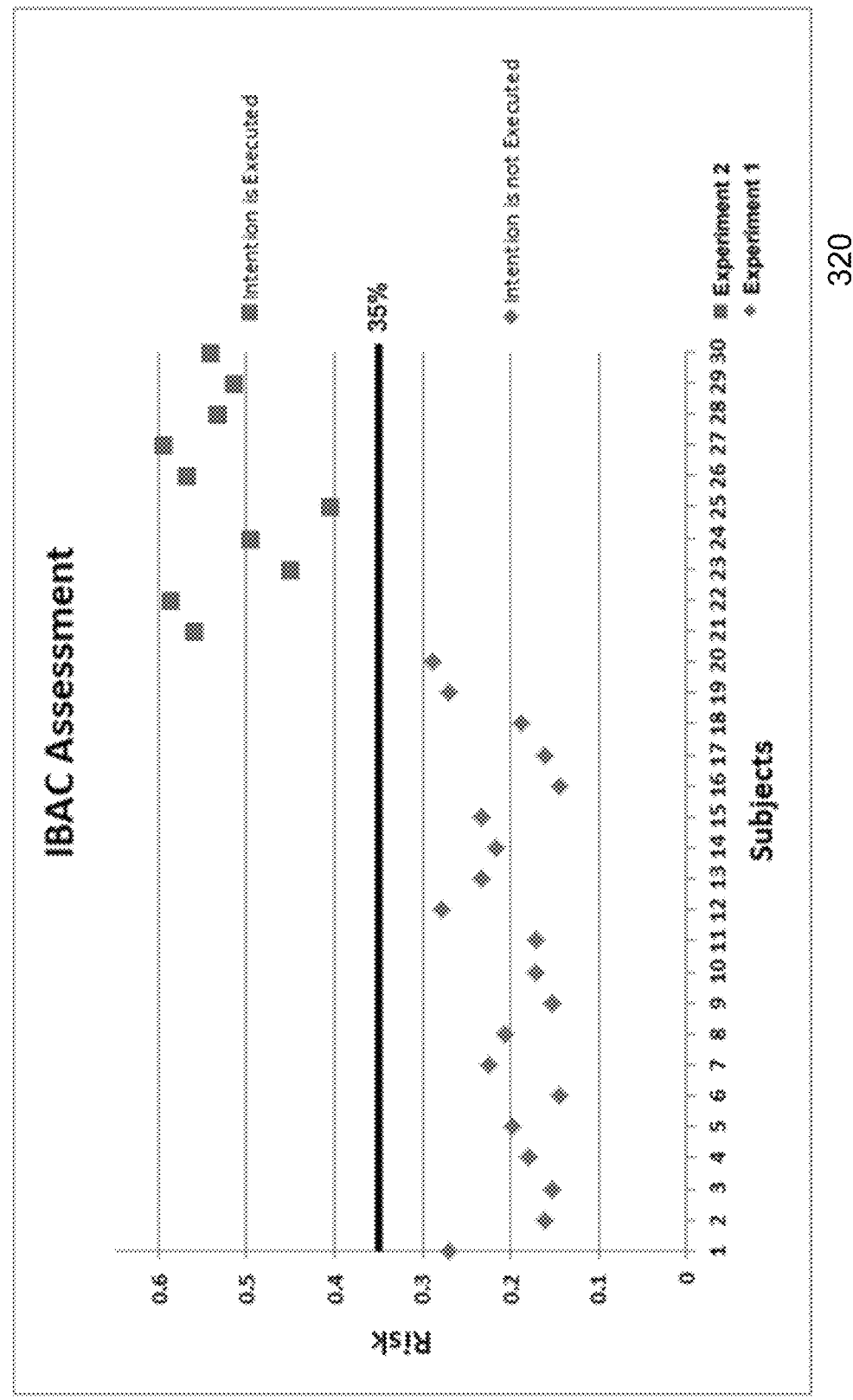
FIG. 11B is a graph illustrating the risk level corresponding to the executed vs. non-executed malicious intentions groups in experiments 1 and 2, where the threshold is set at 35% (text based experiment), according to some embodiments.

FIG. 11B is an example graph 320 illustrating the risk level corresponding to the executed vs. non-executed malicious intentions groups in experiments 1 and 2, where the threshold is set at 35% (text based experiment), according to some embodiments.

Figure 11C:
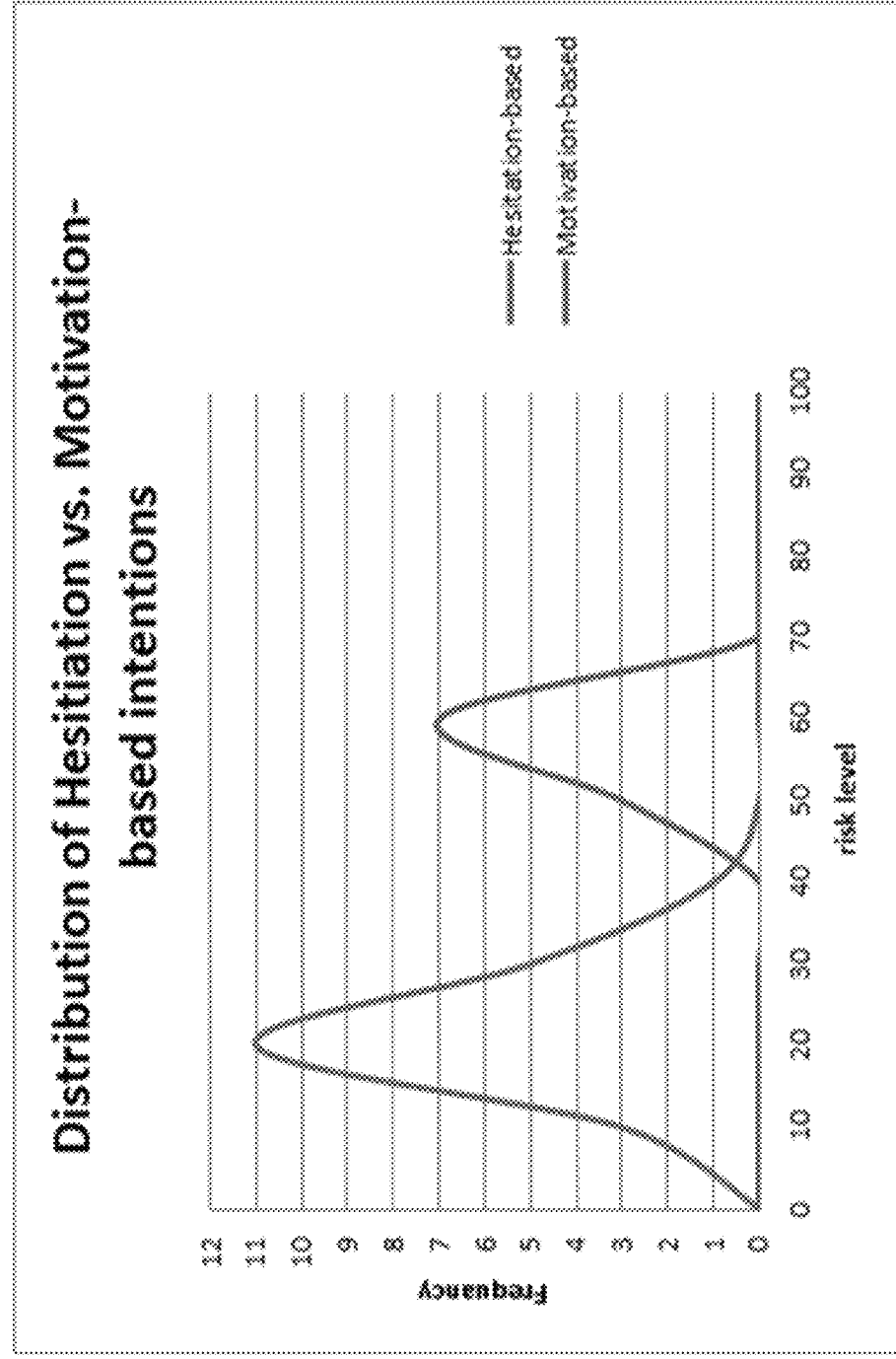
FIG. 11C and FIG. 11D show the distribution of risk levels of hesitation-vs. motivation-based intentions with the thresholds of 40% and 35% that result in 80% insider threat rejection and 100% insider threat rejection, respectively, according to some embodiments.
Figure 11D:
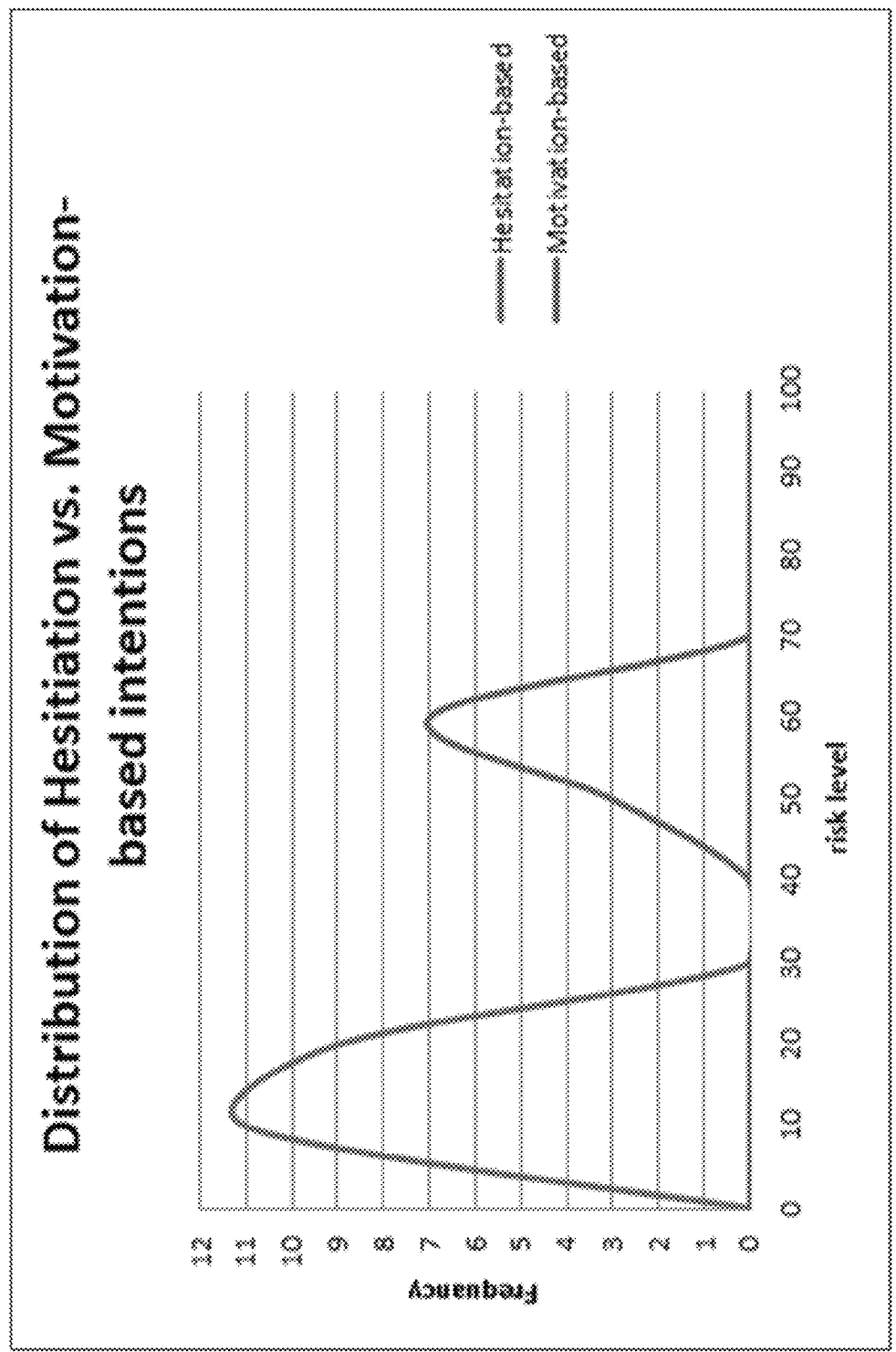

FIG. 11C and FIG. 11D show example graphs 330, 340 of the distribution of risk levels of hesitation- vs. motivation-based intentions with the thresholds of 40% and 35% that result in 80% insider threat rejection and 100% insider threat rejection, respectively, according to some embodiments.

Participants and their Results

Table 9 shows the participants and the intent detection possibility using P300, as well as the motivation level and the total risk, with a 90% intent impact in both experiments

TABLE 9

Risk data of 30 participants.

| Participant | Intention Detected | Motivation Level (IntM) | Total Risk (R) |
| --- | --- | --- | --- |
| 1 | Yes | 0.23 | 0.207 |
| 2 | Yes | 0.26 | 0.234 |
| 3 | Yes | 0.25 | 0.225 |
| 4 | Yes | 0.35 | 0.315 |
| 5 | Yes | 0.29 | 0.261 |
| 6 | Yes | 0.3 | 0.27 |
| 7 | Yes | 0.23 | 0.207 |
| 8 | Yes | 0.36 | 0.324 |
| 9 | Yes | 0.23 | 0.207 |
| 10 | Yes | 0.26 | 0.234 |
| 11 | Yes | 0.385 | 0.3465 |
| 12 | Yes | 0.19 | 0.171 |
| 13 | Yes | 0.29 | 0.261 |
| 14 | Yes | 0.19 | 0.171 |
| 15 | Yes | 0.275 | 0.2475 |
| 16 | Yes | 0.395 | 0.3555 |
| 17 | Yes | 0.21 | 0.189 |
| 18 | Yes | 0.32 | 0.288 |
| 19 | Yes | 0.43 | 0.387 |
| 20 | Yes | 0.5 | 0.45 |
| 21 | Yes | 0.62 | 0.558 |
| 22 | Yes | 0.65 | 0.585 |
| 23 | Yes | 0.5 | 0.45 |
| 24 | Yes | 0.55 | 0.495 |

TABLE 9-continued

Risk data of 30 participants.

| Participant | Intention Detected | Motivation Level (IntM) | Total Risk (R) |
| --- | --- | --- | --- |
| 25 | Yes | 0.45 | 0.405 |
| 26 | Yes | 0.63 | 0.567 |
| 27 | Yes | 0.66 | 0.594 |
| 28 | Yes | 0.59 | 0.531 |
| 29 | Yes | 0.57 | 0.513 |
| 30 | Yes | 0.6 | 0.54 |

Assuming that the intent category value is similar for all participants with a value of 90%, a two-tailed t-test reports the calculated access risk of 30 participants using the IBAC model with participants who did not execute their intentions (M=0.26, SD=0.005) compared with participant who executed their intentions (M=0.52, SD=0.003, p≥0.00005.

This suggests that there exists a difference between users with malicious intentions who have low motivation and users with malicious intentions who have high motivation when using the IBAC model.

Analysis of Variance (ANOVA) also suggests a difference between the risk between the two groups with P<0.0005.

IBAC in Combination with Other Security Systems and Methods

Embodiments of the IBAC system and method disclosed herein may be used in combination with other security systems and methods to create synergistic effects.

For example, in an embodiment, the IBAC system and method disclosed herein may be used in combination with an access control system.

Some access control systems in use adhere to the Role-based Access Control (RBAC) model that sets permissions to entities based on their roles in the company. Other non-discretionary access control models have been used such as History-based Access Control (HBAC).

Figure 12:
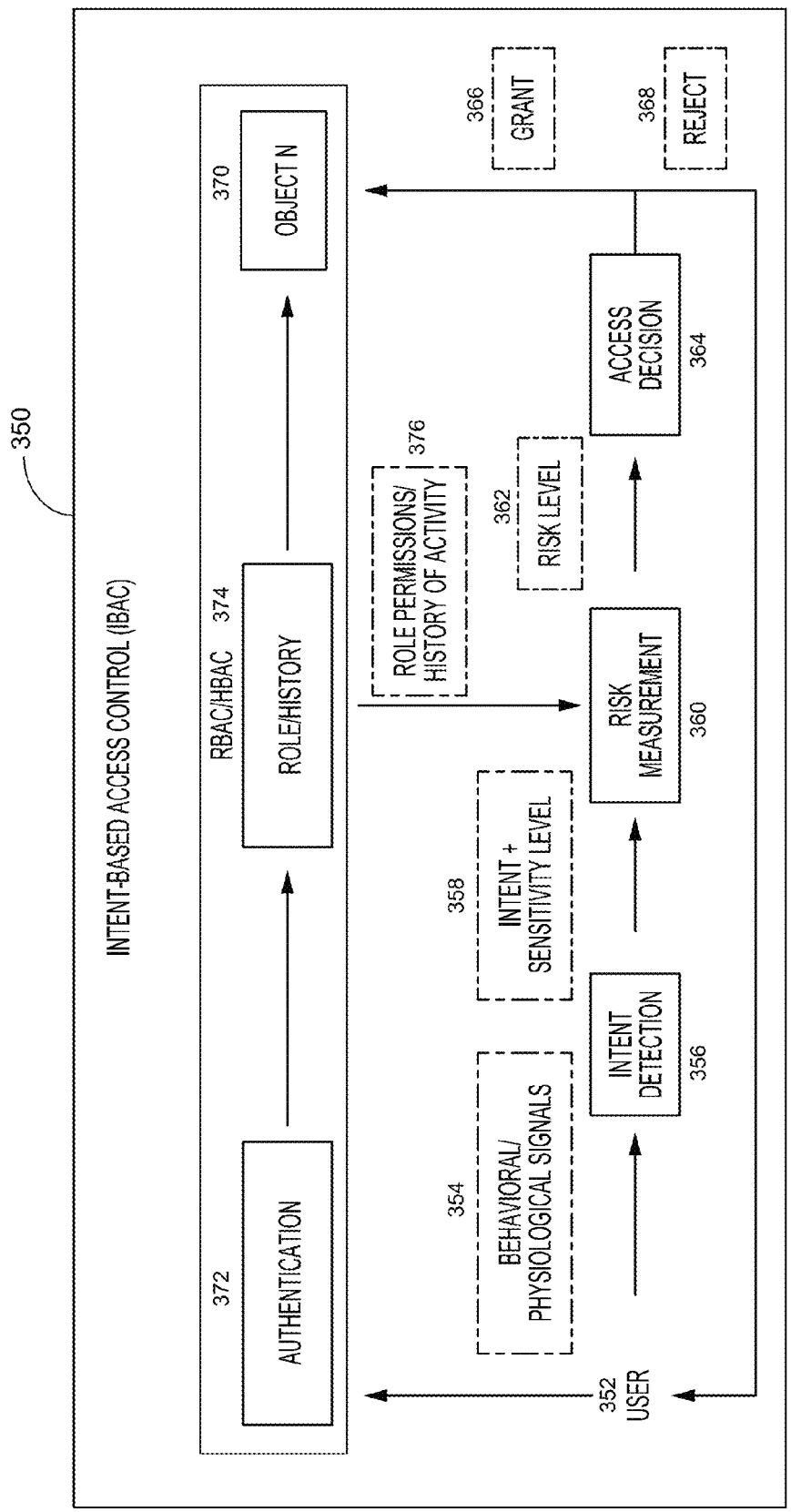
FIG. 12 is a schematic diagram showing integration of an intent-based access control system with an access detection model, according to some embodiments.

FIG. 12 schematically illustrates the integration of the IBAC system 350 and method disclosed herein with an RBAC/HBAC model processor 374 with configured with role and history rules, according to an example embodiment. As depicted, the intent 358 of a user 352 is determined by intent detection hardware 356 (including at least one processor) by measuring behavioral/physiological signals 354 associated with the user 352. Risk measurement hardware 360 (including at least one processor) may determine a risk level or score 262 associated with a protected resource (object N 370). The IBAC system 350 has access decision hardware 366 to grant 366 or reject 368 access by the user 352 to the protected resource (object N 370) based on the intent level 358 and risk level 362. Further, motivation level may be used to grant 366 or reject 368 access by the user 352 to the protected resource (object N 370).

An integrated system could be deployed, for example, to secure physical access to a facility, a user's car, access to computer files. For example, an employee with mal-intent should not be allowed access to a datacenter or access to commands that shutdown the main server. A person carrying a valid entry visa with mal-intent should not be allowed border entry.

The IBAC system 350 may include authentication hardware 372 to authenticate the user 352 and provide output of the results of the authentication to the RBAC/HBAC model processor 374. The RBAC/HBAC model processor 374 defines a set of role permissions and history of activity 376 for provision as output to the risk measurement hardware 360. In an embodiment, the EEG signals may be processed both to determine intent and to establish identity. For example, EEG signals may be used to establish a biometric measure or other unique signature of users. The EEG signal may also be used in place of password typing, where the user is simply asked to "think" of the password in order to perform authentication.

As noted, embodiments of the IBAC system 350 and method disclosed herein overcome many of the weaknesses of conventional access control systems. For example, identity-based access control systems do not take into consideration the insider threat factor by basing the access decision only on identity. IBAC addresses this vulnerability and assess the intention as a risk factor. Therefore, existing access control systems when integrated with an IBAC system 350 and method become much more sensitive to the insider threat and address the insider threat as risk factor. As a result, security against the insider threat is improved.

In an embodiment, the IBAC system 350 and method disclosed herein may also be used in combination with a dynamic access control system, e.g., one adhering to the Risk-Adaptive Access Control (RAdAC) model. RAdAC is a dynamic risk-based access control model that assesses the risk based on characteristics of people, characteristics of IT components, characteristics of objects, environmental factors, situational factors and heuristics. Implementation of each of the assessment components presents challenges. For example, The National Institute of Standards and Technology (NIST) has averted to the challenge of obtaining characteristics of people, stating: "User Information—This is the source of any information RAdAC would need to assess the trustworthiness of the people involved in the access decision, such as identification and authentication information, and authorizations such as their security clearance. Since RAdAC will have to render access decisions for people that do not hold security clearances, other information will need to be available to use in the risk determination process to determine a level of risk associated with granting them access. What sort of information might be valuable to determining their trustworthiness? Could a mini background investigation be done online".

Figure 13:
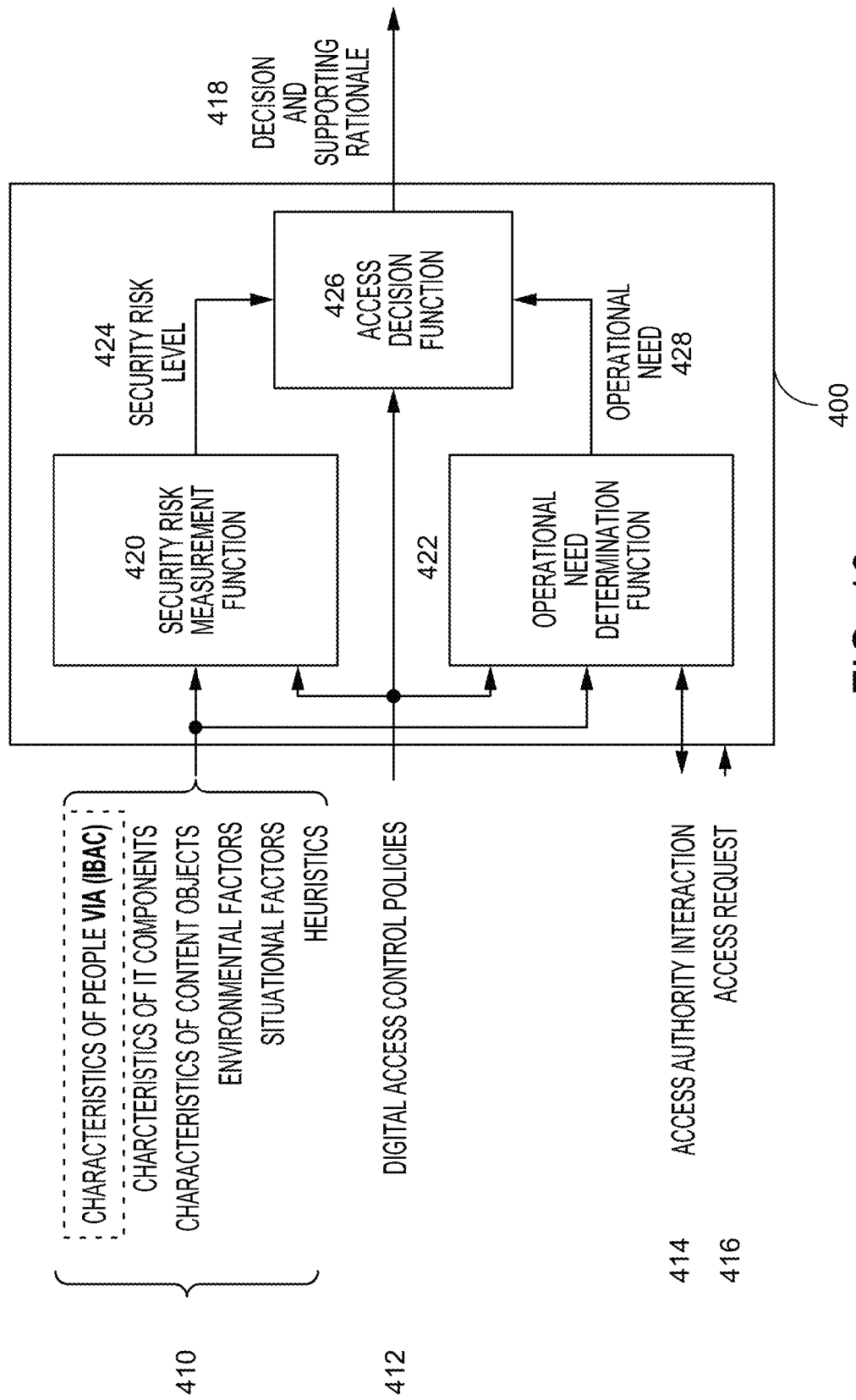
FIG. 13 is a schematic diagram showing integration of an intent-based access control system with a Risk-Adaptive Access Control model, according to some embodiments.

FIG. 13 shows an access control system 400 according to some embodiments. As illustrated in FIG. 13, the IBAC system and method disclosed herein may provide input data 410 to the access control system 400. For example, the input data 410 may be based on the RAdAC model, namely, to provide "Characteristics of People" or "User Information." Other types of input data 410 include Characteristics of Components, Characteristics of Content Objects, Environmental Factors, Situational Factors, and Heuristics, that may be received from an IBAC system or other system or component. The access control system 400 may also receive, as input, digital access control policies (defined as electronic data structures). The access control system 400 may exchange data for an access authority interaction 414 with an IBAC system or other system or component. The access control system 400 receives an access request 416 for a protected resource as input and provides a decision and supporting rationale 418 to grant or deny access to the protected resource as output.

The example access control system 400 has security risk measurement hardware 420 that receives input data 410 and the digital access control policies 412 to determine a security risk level for the access request. The security risk measurement hardware 420 provides the determined security risk level to access decision hardware 426. The example access control system 400 has operational need determination hardware 422 that receives input data 410 and the digital access control policies 412 and performs data exchange for an access authority interaction 414 to determine an operational need metric or level. The operational need determination hardware 422 provides the determined operational need metric or level to access decision hardware 426. The access decision hardware 426 computes or determines the decision and supporting rationale 418 to grant or deny access to the protected resource for the output of the access control system 400.

In an embodiment, the EEG signals may be processed both to determine intent and to identify an emotional state of a user. For example, EEG signals may be processed alone, or in combination with facial expressions, micro expressions, body language, speech patterns to determine an emotional state. Information regarding emotional state may be used (e.g., in an RAdAC system) to determine whether or not to grant access. For example, in some cases, an angry employee should not be granted access to a workplace.

The IBAC system and method disclosed herein enable denial of access to authorized individuals who have a high level of a negative intentions, and embodiments may work on top of existing identity-based access control system. The existing authentication methods do not deny access to an authorized entity that has turned into a malicious insider, yet it denies a person in needs of access even if their intentions of access are genuine. The main vulnerability with existing authentication methods is that a trusted entity remains forever trusted or until her access privileges have been revoked, and a user who is not enrolled is not trusted forever or until enrolment. The IBAC system and method disclosed does not rely simply on identity, and thus does addresses the noted vulnerability.

Other Behavioural/Physiological Signals

Although embodiments using EEG signals have been detailed above, in other embodiments, the IBAC system and method disclosed herein may also use other behaviourial/physiological signals in conjunction with EEG signals, or in place of EEG signals. Such other signals may include electrocardiogram (ECG) signals, muscle movement signals, electromyogram (EMG) signal, skin conductance, Galvin Skin Response (GSR) signals, body temperature, voice signals, signals from organs other than the brain, or the like.

Computing Device Implementation

Figure 14:
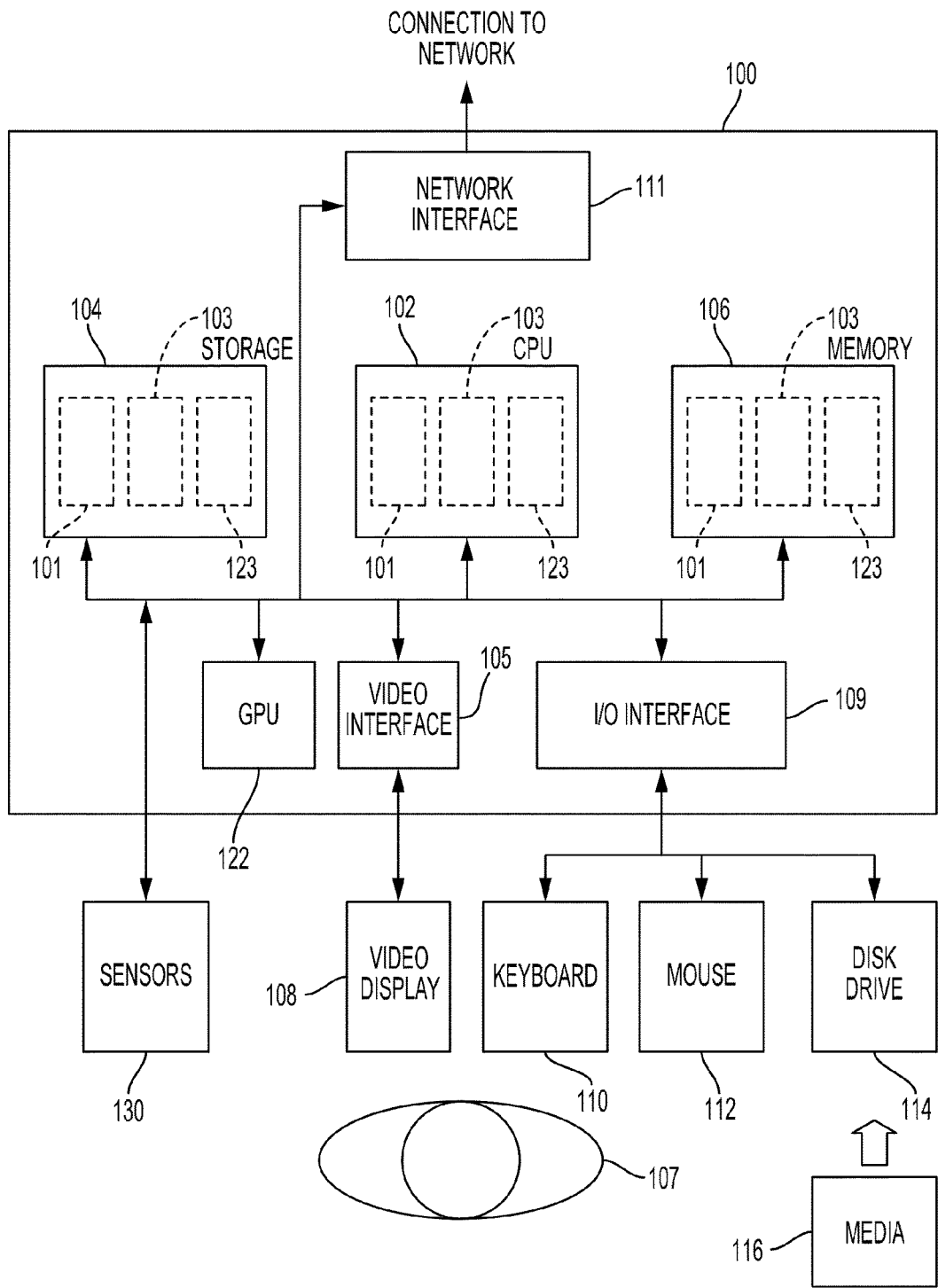
FIG. 14 is a schematic diagram of a computing device, according to some embodiments.

The present IBAC control system and method may be practiced in various embodiments. A suitably configured computer device, and associated communications networks, devices, software and firmware may provide a platform for enabling one or more embodiments as described above. By way of example, FIG. 14 shows a computing device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 115, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown).

One or more different types of sensors 130 may be used to receive input from various sources, e.g., to measure the various behaviour/physiological signals described herein. So, sensor 130 may include any combination of EEG sensors, ECG sensors, muscle movement sensors, EMG sensors, skin conductance sensors, GSR sensors, body temperature sensors, or the like.

In some embodiments, computing device 100 may be a desktop or a laptop computer. In other embodiments, computing device 100 may be a mobile computing device. A mobile computing device may be a two-way communication device with advanced data communication capabilities having the capability to communicate with other computer systems and devices. The mobile device may include the capability for data communications and may also include the capability for voice communications. Depending on the functionality provided by the mobile device, mobile device may be referred to as a portable electronic device, smartphone, a data messaging device, a two-way pager, a cellular telephone with data messaging capabilities, personal digital assistant, a wireless Internet appliance, a portable laptop computer, a tablet computer, a media player, an electronic reading device, a data communication device (with or without telephony capabilities) or a combination of these.

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), blue-ray disks, or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device, tracking module, object tracking application, etc., or accessible or connectable thereto. Any application or module herein described may be implemented using computer readable/executable instructions that may be stored or otherwise held by such computer readable media.

Although the disclosure has been described and illustrated in exemplary forms with a certain degree of particularity, it is noted that the description and illustrations have been made by way of example only. Numerous changes in the details of construction and combination and arrangement of parts and steps may be made. Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations and modifications are possible, and even advantageous, in various circumstances. The invention is intended to encompass all such variations and modification within its scope, as defined by the claims.

What is claimed is:

1. An intent-based access control method comprising:
   receiving, from a user, one or more electronic signals representative of a request to obtain access to a protected resource;
   monitoring one of more physiological signals associated with the user, the one or more physiological signals including at least brain signals;
   presenting stimuli to the user, the stimuli adapted to evoke a physiological or behavioral response;
   measuring one or more event-related potentials in the monitored one or more physiological signals;
   processing the one or more event-related potentials to detect signals indicative of (i) a potential intention of the user and (ii) a potential motivation of the user to act on the potential intention;
   processing the one or more event-related potentials to assign (i) an intention score based at least on the detected signals indicative of the potential intention of the user and (ii) a motivation score based at least on the detected signals indicative of the potential motivation of the user to act on the potential intention;
   determining a risk score associated with the protected resource based at least on the intention score and motivation score in relation to an impact of malicious access to the protected resource; and
   determining whether the request to obtain access to the protected resource should be granted or denied based at least on a combination of the intention score, the motivation score, and the risk score.

2. The method of claim 1, further comprising:
   if the user that obtains access to the protected resource is associated with an intention score above a first pre-defined threshold and a motivation score above a pre-defined threshold, toggling an electronic flag in an electronic profile associated with the user to indicate that the user should be monitored for a pre-defined period of time to detect a future potential motivation.

3. The method of claim 1, wherein the motivation score is adapted to correspond at least to the likelihood of the potential intention being executed by the user.

4. The method of claim 1, wherein the access to the protected resource may be granted at a number of different levels, each of the different levels having different access permissions.

5. The method of claim 4, further comprising:
   using the combination of the intention score, the motivation score, and the risk score, determining a level of access to be provided to the user; and
   providing access at the determined level of access to the user.

6. The method of claim 1, wherein the one or more event-related potentials includes at least a P300 signal, the processing of the one or more event-related potentials includes measuring a peak amplitude of the P300 signal.

7. The method of claim 6, wherein the peak amplitude of the P300 signal is indicative of both the potential intention and the potential motivation of the user, the potential intention being detected when the peak amplitude is greater than a pre-defined threshold, and the potential motivation being quantified as proportional to the peak amplitude of the P300 signal.

* * * * *